United States Patent
Togawa

(10) Patent No.: US 10,514,974 B2
(45) Date of Patent: Dec. 24, 2019

(54) LOG ANALYSIS SYSTEM, LOG ANALYSIS METHOD AND PROGRAM RECORDING MEDIUM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 140 days.

(21) Appl. No.: 15/551,844

(22) PCT Filed: Feb. 12, 2016

(86) PCT No.: PCT/JP2016/000723
§ 371 (c)(1),
(2) Date: Aug. 17, 2017

(87) PCT Pub. No.: WO2016/132717
PCT Pub. Date: Aug. 25, 2016

(65) Prior Publication Data
US 2018/0046529 A1    Feb. 15, 2018

(30) Foreign Application Priority Data

Feb. 17, 2015  (JP) .................................. 2015-028455

(51) Int. Cl.
*G06F 11/07* (2006.01)
*G06F 11/34* (2006.01)

(52) U.S. Cl.
CPC ........ *G06F 11/079* (2013.01); *G06F 11/0751* (2013.01); *G06F 11/0775* (2013.01);
(Continued)

(58) Field of Classification Search
CPC .............................. G06F 11/07; G06F 11/079
(Continued)

(56) References Cited

U.S. PATENT DOCUMENTS 9,176,798 B2    11/2015   Watanabe et al.
9,397,831 B2    7/2016    Fukuda et al.
(Continued)

FOREIGN PATENT DOCUMENTS

JP    09-55763      2/1997
JP    2006-259811   9/2006
(Continued)

OTHER PUBLICATIONS

International Search Report, PCT/JP2016/000723, dated Apr. 5, 2016.
(Continued)

*Primary Examiner* — Kamini B Patel
(74) *Attorney, Agent, or Firm* — Young & Thompson

(57) ABSTRACT

In order to specify and analyze a failure occurring in an information processing system with a high degree of accuracy, an log analysis system includes an analysis unit comparing a structural pattern of a log message group constituted by at least one log message with a known pattern, and associating, with the structural pattern of the log message group, reference information including information about the known pattern matching a structural pattern of another log message group supplementary the log message group, and a pattern generation unit generating a new pattern from the log message group having a structural pattern different from the known pattern in accordance with an analysis result given by the analysis unit.

20 Claims, 28 Drawing Sheets

(52) U.S. Cl.
CPC ...... *G06F 11/0778* (2013.01); *G06F 11/0787* (2013.01); *G06F 11/3476* (2013.01)

(58) Field of Classification Search
USPC .......................................................... 714/37
See application file for complete search history.

(56) References Cited

U.S. PATENT DOCUMENTS

| | | | | |
|---|---|---|---|---|
| 2006/0259968 | A1* | 11/2006 | Nakakoji | G06F 21/552 |
| | | | | 726/22 |
| 2011/0083123 | A1* | 4/2011 | Lou | G06F 11/079 |
| | | | | 717/125 |
| 2011/0154117 | A1* | 6/2011 | Danielson | G06F 11/0748 |
| | | | | 714/37 |
| 2014/0143625 | A1* | 5/2014 | Watanabe | G06F 11/008 |
| | | | | 714/741 |
| 2014/0289527 | A1* | 9/2014 | Fukuda | H04L 63/0428 |
| | | | | 713/171 |
| 2016/0080305 | A1* | 3/2016 | Samuni | H04L 51/24 |
| | | | | 709/207 |
| 2016/0112285 | A1* | 4/2016 | Kim | H04L 41/069 |
| | | | | 709/224 |
| 2016/0124823 | A1* | 5/2016 | Ruan | G06F 11/2257 |
| | | | | 714/26 |
| 2016/0224402 | A1* | 8/2016 | Togawa | G06F 11/0778 |
| 2016/0261541 | A1* | 9/2016 | Samuni | G06F 11/0706 |
| 2018/0349801 | A1* | 12/2018 | Togawa | G06F 11/07 |
| 2018/0357214 | A1* | 12/2018 | Ajiro | G06F 11/34 |
| 2018/0365124 | A1* | 12/2018 | Togawa | G06F 11/3485 |

FOREIGN PATENT DOCUMENTS

| | | |
|---|---|---|
| JP | 2009-066693 | 4/2009 |
| JP | 2010-066840 | 3/2010 |
| JP | 2011-002916 | 1/2011 |
| JP | 2012-094046 | 5/2012 |
| JP | 2014-102661 | 6/2014 |
| JP | 2014-119982 | 6/2014 |
| JP | 2014-183562 | 9/2014 |
| JP | 5621667 | 11/2014 |

OTHER PUBLICATIONS

Ryosuke Togawa, "A log analysis method using sequential log patterns for large scale systems", IEICE Technical Report, Jan. 8, 2015 (Jan. 8, 2015), vol. 114, No. 389, pp. 13 to 18, ISSN 0913-5685, particularly, pp. 15 to 16.

Motomitsu Adachi et al., "System Management and Operation for Cloud Computing Systems", Fujitsu Scientific & Technical Journal, vol. 48, No. 2, pp. 151-158 (Apr. 2012) (Updated Version)..

* cited by examiner

Fig. 2

```
1001 141101 12:00:01 sshd[17356] : Accepted publickey for   .
1002 141101 12:00:01 sshd[17356] : Accepted password for ...
7003 141101 12:00:03 [Note] user/libexec/mysqld: ...
...
```
110

Fig. 3

| NORMAL PATTERN ID | NORMAL PATTERN |
|---|---|
| 1 | 1001, 2004, 3009, 5025 |
| ... | ... |
| ... | ... |

| ABNORMAL PATTERN ID | ABNORMAL PATTERN |
|---|---|
| 1 | 1001, 2004, 3009, 8064, 8065 |
| ... | ... |
| ... | ... |

| ABNORMAL PATTERN ID | ASSOCIATED NORMAL PATTERN ID |
|---|---|
| 1 | 10,11,12 |
| ... | ... |

| LOG ID | LOG MESSAGE |
|---|---|
| 1 | sshd[ ]: Accepted publickey ... |
| 2 | sshd[ ]: Accepted password |
| ... | ... |

| OCCURRENCE DATE AND TIME | ABNORMAL PATTERN ID | ACTION CONTENT |
|---|---|---|
| 2014/11/15 09:01:15 | 34 | ABNORMALITY CAUSED BY BUG POTENTIALLY EXISTING IN SOFTWARE, PROBLEM SOLVED BY RESTARTING SOFTWARE |

148

LOG ANALYSIS SYSTEM, LOG ANALYSIS METHOD AND PROGRAM RECORDING MEDIUM

TECHNICAL FIELD

The present invention relates to a log analysis system, a log analysis method, and a program recording medium analyzing a log that is output by an information processing system.

BACKGROUND ART

A person who operates and maintains an information processing system (hereinafter referred to as an administrator) analyzes a log output from the system and judges a state of the system. In a management of the information processing system so far, the administrator has generated rules for analyzing the log. However, since a size of log output from the recent information processing system becomes enormous and the administrator cannot check all the logs, it is difficult to comprehensively generate rules for analyzing logs. Therefore, a technique for analyzing the state of the system using analysis rules of logs automatically generated is proposed.

PTL 1 discloses an incident management system that shortens the time required for failure recovery work in incident management operation work. The system of PTL 1 determines similarity between a failure occurring in a monitor target device and a failure registered as an incident in the past and presents a similar incident. The system of PTL 1 calculates a match rate of characters included in a host name, an application name, and a message included in a log message output at the time of a failure, and presents a past incidence whose matching rate is equal to or more than a certain value as a similar incident.

When a general-available information processing apparatus executes certain processing, the general-available information processing apparatus outputs a plurality of messages corresponding to the execution of the processing in a predetermined chronological order. As described above, a plurality of messages to be output to in a predetermined chronological order when the information processing apparatus executes specification processing is referred to as "a series of messages".

PTL 2 discloses a device failure analysis apparatus that can find a part of an event log that serves as a clue to specify the cause of failure in a short period of time. The apparatus of PTL 2 defines a series of message output at normal time as a pattern at normal time, calculates the degree of coincidence between the pattern at the normal time and an operation log of the device, and detects an operation log of which degree of coincidence is equal to or less than a threshold value as abnormal log. More specifically, the apparatus of PTL 2 analyzes a log based on "information for grouping a series of messages in processing units".

PTL 3 discloses an abnormality diagnosis apparatus for detecting abnormality of a large scale system and identifying an abnormality occurrence location. In the apparatus of PTL 3, a normal model is generated in sub system units that constitute the system, and data not included in the normal model is detected as abnormality. The apparatus of PTL 3 specifies the abnormality location of the system based on the detected abnormality and the hierarchical dependency of the sub system.

Other than the above, several techniques concerning information analysis of log, pattern, failure analyze or the like are disclosed.

PTL 4 discloses an encryption communication apparatus that realizes encryption communication in which traffic within a communication system is reduced while securing the security of data in a packet transmitted within the communication system. The apparatus of PTL 4 extracts a data part whose data pattern matches data in a processing target packet and data in a sample packet, and creates matching data.

PTL 5 discloses an infection activity detection apparatus that detects with high certainty that a monitor target device is infected with a self-infection type malignant program. The apparatus of PTL 5 extracts log data constituted by a log record concerning access within a predetermined period of time.

PTL 6 discloses a remote maintenance system which copes with a failure occurring at a monitor target server from a remote place. The system of PTL 6 isolates the cause of a failure caused by the monitor target apparatus and selects, for each failure cause, appropriate information from failure messages and dealing information prepared in advance.

PTL 7 discloses an operation pattern generation apparatus that generates various motion patterns from a predetermined motion pattern. The apparatus of PTL 7 generates an operation pattern by generating time series data according to transition probability and output probability of hidden Markov model.

PTL 8 discloses a log analyze apparatus which collects a log file group designated by a server and converts the collected log file group into intermediate format log information in a common format. The apparatus of PTL 8 applies a conversion rule to the intermediate format log information and generates an integrated log which is easy to analyze.

PTL 9 discloses a communication state display method suitable for communication support via a network. In the method of PTL 9, a source and a destination, a date and time, and a subject are acquired with respect to a message such as an e-mail, a unique identifier is given to each piece of data, and these pieces of data are managed using an accumulated data management table in a data server.

CITATION LIST

Patent Literature

[PTL 1] Japanese Patent Laid-Open Application Publication No. 2014-119982
[PTL 2] Japanese Patent Laid-Open Application Publication No. 2012-94046
[PTL 3] Japanese Patent No. 5621667
[PTL 4] Japanese Patent Laid-Open Application Publication No. 2014-183562
[PTL 5] Japanese Patent Laid-Open Application Publication No. 2011-2916
[PTL 6] Japanese Patent Laid-Open Application Publication No. 2010-66840
[PTL 7] Japanese Patent Laid-Open Application Publication No. 2009-66693
[PTL 8] Japanese Patent Laid-Open Application Publication No. 2006-259811
[PTL 9] Japanese Patent Laid-Open Application Publication No. H9-55763

SUMMARY OF INVENTION

Technical Problem

The incident management system of PTL 1 uses a known failure as a target of detection and analysis, and the incident management system of PTL 1 cannot adopt an unknown failure as a target. In order to detect an unknown failure occurring in the information processing system, it is necessary to make a known normal state together with the known failure into a rule, but the system of PTL 1 does not disclose a method to generate the rule. The technique disclosed by PTL 1 presents a false incident when a new failure including a known log message occurs. In order to analyze the failure with a high degree of accuracy, it is necessary to analyze not only a log message alone but also a series of log messages about processing.

The apparatuses of PTL 2 and PTL 3 have only the pattern at normal time, and therefore, when the same failure as the past occurs, it cannot be linked with the failure that occurred in the past. The apparatus of PTL 2 and PTL 3 cannot distinguish between abnormalities because the apparatus of PTL 2 and PTL 3 detect, as abnormality, a difference in the device operation log from the pattern in the normal time.

More specifically, in the techniques disclosed by PTL 1 to PTL 3, the coincidence or difference is detected with a rule, and therefore, it is impossible to present information about a failure that occurs as a result of a combination of normal operations. In order to present information about a failure that occurs due to a combination of normal operations, it is necessary to present information about the normally completed operation.

When the techniques disclosed in PTLs 1 to 9 are combined, it is possible to extract a non-normal pattern from a log and detect a failure of the monitor target system based on the extracted pattern. However, even if the techniques disclosed by PTL 1 to 9 are combined, it is impossible to present information about a failure that occurs due to the combination of normal operations.

It is an object of the present invention to provide a log analysis system that can specify and analyze a failure occurring in an information processing system with a high degree of accuracy.

Solution to Problem

A log analysis system according to the present invention includes analysis means that performs analysis by comparing a structural pattern of a log message group constituted by at least one log message with a known pattern, and associates, with the structural pattern of the log message group, reference information including information about the known pattern matching a structural pattern of another log message group supplementary the log message group, and pattern generation means that generates a new pattern from the log message group having a structural pattern different from the known pattern in accordance with an analysis result given by the analysis means.

A log analysis method according to the present invention includes performing analysis by comparing a known pattern and a structural pattern of a log message group structured by at least one log message, associating, with the structural pattern of the log message group, reference information including information about the known pattern matching a structural pattern of another log message group supplementary to the log message group, and generating a new pattern from the log message group having a structural pattern different from the known pattern according to an analysis result.

A program recording medium according to the present invention is recorded with a log analysis program causing a computer to execute processing for performing analysis by comparing a known pattern and a structural pattern of a log message group structured by at least one log message, processing for associating, with the structural pattern of the log message group, reference information including information about the known pattern matching a structural pattern of another log message group supplementary to the log message group, and processing for generating a new pattern from the log message group having a structural pattern different from the known pattern according to an analysis result.

Advantageous Effects of Invention

According to the present invention, a log analysis system that can specify and analyze a failure occurring in an information processing system with a high degree of accuracy can be provided.

BRIEF DESCRIPTION OF DRAWINGS

FIG. 2 is a figure illustrating an example of a log file according to the first example embodiment of the present invention.

FIG. 3 is a figure illustrating an example of a normal pattern according to the first example embodiment of the present invention.

FIG. 4 is a figure illustrating an example of an abnormal pattern according to the first example embodiment of the present invention.

FIG. 5 is a figure illustrating an example of a reference log according to the first example embodiment of the present invention.

FIG. 17 is a figure illustrating an example of classification information according to the second example embodiment of the present invention.

FIG. 19 is a figure illustrating an example of failure dealing information according to the third example embodiment of the present invention.

DESCRIPTION OF EMBODIMENTS

Figure 1:
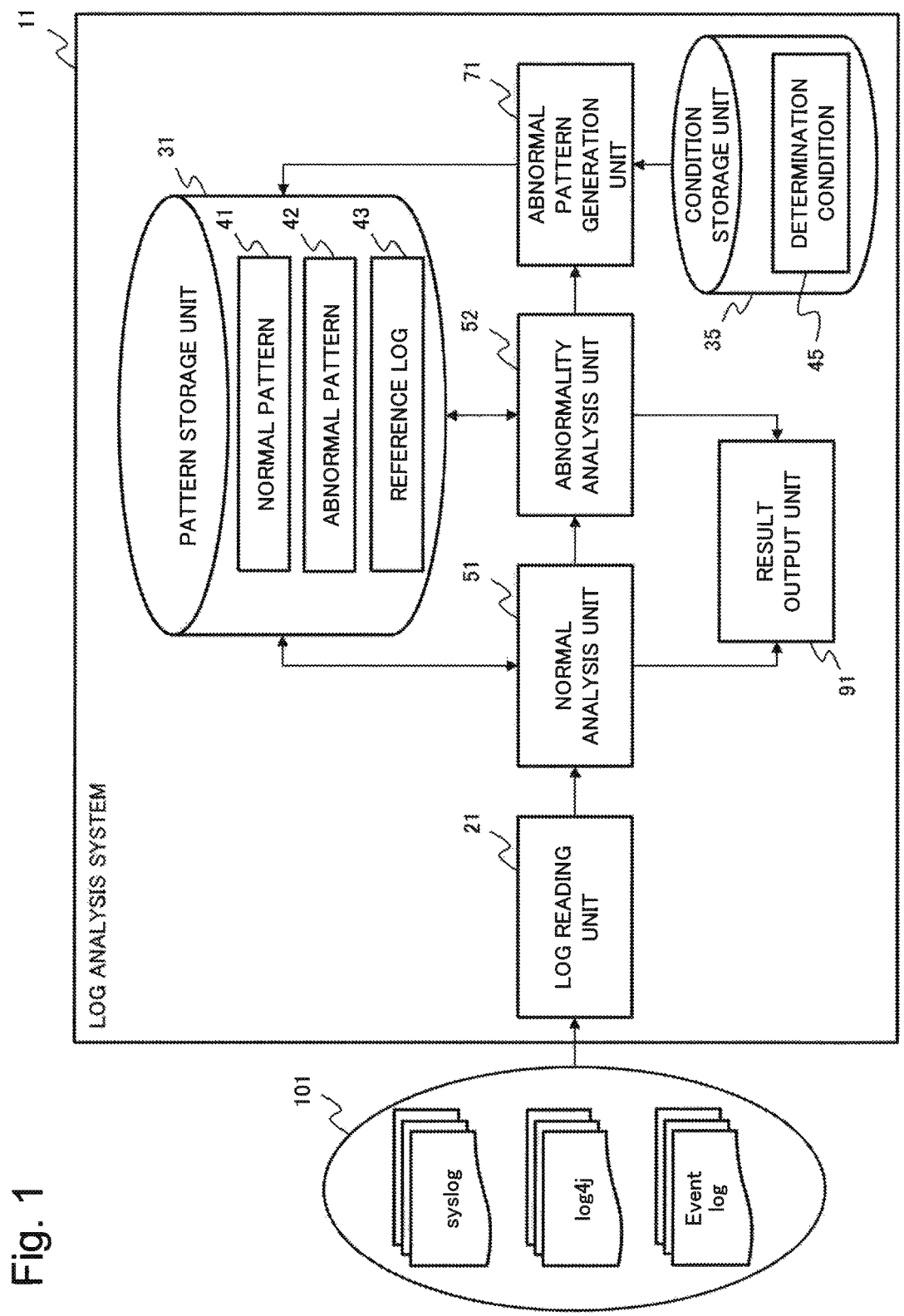
FIG. 1 is a block diagram showing a structure of a log analysis system according to a first example embodiment of the present invention.

Hereinafter, modes for implementing the present invention will be described with reference to the drawings. However, although the following discussed example embodiments are technically preferable limitations for implementing the present invention, the scope of the invention is not limited to the following.

In all the drawings used for the explanation of the following example embodiments, same reference numerals are given to similar parts unless there is a particular reason. In the following example embodiments, repeated description may be omitted for substantially similar structure and operation. The direction of arrows in the drawing indicates an example, and does not limit the direction of signals between blocks.

(First Example Embodiment)

First, a log analysis system 11 according to the first example embodiment of the present invention will be explained with reference to drawings.

[Structure]

FIG. 1 is a block diagram illustrating a structure of the log analysis system 11 according to the present example embodiment. As shown in FIG. 1, the log analysis system 11 includes a log reading unit 21, a pattern storage unit 31, a condition storage unit 35, a normal analysis unit 51, an abnormality analysis unit 52, an abnormal pattern generation unit 71, and a result output unit 91.

The log analysis system 11 acquires a log file 101 (hereinafter simply referred to as a log file) output from an information processing system (not shown), and analyzes a log message (also referred to as a log record) included in the log file.

{Log File}

The log file is constituted by at least one log message. Normally, the log file is output along with occurrence of an event in an application or a system which is an analysis target. The log file contains information in which a log message in which an event occurred in an application or a system and a time when the event occurred is corresponding to each other is sorted in a chronological order. FIG. 1 shows syslog, log4j, and Event log as examples of log files.

The log file is a log message or a set of log messages. Hereafter, multiple log messages may also be referred to as a log message group. The log file may be simply referred to as a log.

FIG. 2 shows an example of a log file (log file 110) including multiple log messages. In FIG. 2, at least one log message included in the log file include multiple log elements such as a time at which the message was output, a log ID (Identifier) which is an identifier unique to the message, a message body, and a log level. The log file handled by the log analysis system 11 may include log elements not included in the example of FIG. 2, and may not include some of the log elements included in the example of FIG. 2.

{Log Reading Unit}

The log reading unit 21 is log collection means which reads a log file of an analysis target and sends a log message constituting the read log file to the normal analysis unit 51.

It should be noted that the log reading unit 21 may directly receive a log from the system of the analysis target, read a log file from a storage unit (not shown), or directly receive an input of a log file entered by an administrator. For example, the log reading unit 21 may receive, from the administrator, a designation of a log file to be a read target, a designation of a date and time at which a log message which is to be read target was output. The log reading unit 21 may read a file (not shown) in which information necessary for analysis of a log is defined, and according to the information defined in the file, the log reading unit 21 may convert the format of the read log file into a format that can be easily analyzed by the log analysis system 11.

{Pattern Storage Unit}

The pattern storage unit 31 is storage means that stores a normal pattern 41 (hereinafter referred to as a normal pattern), an abnormal pattern 42 (hereinafter referred to as an abnormal pattern), and a reference log 43 (hereinafter referred to as a reference log).

The normal pattern (also referred to a first pattern) is a combination or a chronological order of log messages which are output when the target system is normal. The combination or a chronological order of log messages may also be referred to as a structural pattern. The normal pattern is constituted by at least one log message. The normal pattern has a pattern ID (hereinafter referred to as a normal pattern ID) which is a unique identifier.

FIG. 3 shows a normal pattern table 141 which is an example of the normal pattern. In the normal pattern table 141 of FIG. 3, a normal pattern (hereinafter, referred to as a normal pattern "1") having a normal pattern ID of 1 is a combination of four log messages to which log IDs 1001, 2004, 3009, 5025 are given. More specifically, the normal pattern "1" has a structural pattern of "1001, 2004, 3009, 5025".

In FIG. 3, the log ID is used to represent the normal pattern, but the log message itself may be used instead of the log ID. In order to express a normal pattern, a chronological order may be expressed by a character string in which numbers meaning the log IDs are arranged in order, or a combination of letters and arrows. For example, a normal pattern may be expressed as, e.g., "1234", "1, 2, 3, 4", "1 →2→3→4" to indicate that the chronological order is 1, 2, 3, 4. Further, the normal pattern may be described in the form of automaton representing a state transition.

The normal pattern may have information about a prescribed time (also referred to as a first time) corresponding to the time from the beginning of the pattern to the normal completion. The prescribed time corresponds to the upper limit value of the time that the normal pattern is expected to be completed. The prescribed time may be defined individually for each normal pattern, or a unique value may be defined for the whole normal pattern set.

An abnormal pattern (also referred to as a second pattern) is a structural pattern when the structural pattern of the log message group included in the log file of the analysis target does not match the normal pattern. When an abnormality log containing a structural pattern that does not match the abnormal pattern is detected by the abnormality analysis unit 52, an abnormal pattern is generated by the abnormal pattern generation unit 71 based on its abnormality log and stored in the pattern storage unit 31. The abnormal pattern is constituted by at least one log message.

The abnormal pattern is defined as a combination of a structural pattern that partially matches a normal pattern and a structural pattern that does not match a normal pattern. More specifically, the abnormal pattern is a structural pattern obtained by combining a log message included in a normal pattern and a log message not included in a normal pattern. The abnormal pattern has a pattern ID (hereinafter referred to as an abnormal pattern ID) which is a unique identifier. The abnormal pattern can be expressed in a form similar to a normal pattern.

FIG. 4 illustrates an abnormal pattern table 142 which is an example of an abnormal pattern. In the abnormal pattern table 142 of FIG. 4, an abnormal pattern (hereinafter referred to as an abnormal pattern "1") having an abnormal pattern ID of 1 is a combination of five log messages of which log IDs are 1001, 2004, 3009, 8064, 8065. When FIG. 4 is compared with the normal pattern table 141 of FIG. 3, it is found that, in the abnormal pattern "1", the combination having log IDs 1001, 2004, 3009 is included in the normal pattern "1". However, in the abnormal pattern "1", the log messages having the log IDs 8064 and 8065 are not included in normal pattern "1".

The reference log 43 (also referred to as reference information) is information about the normal pattern that matches the structural pattern occurring together with an abnormality log when the abnormality log occurs. The reference log is information about the normal pattern that matches the structural pattern occurred within a predetermined period of time based on the occurrence time of an abnormality log when the abnormality log occurs. More specifically, the reference log is information about the normal pattern that matches the structural pattern that occurred from minutes defined in a predetermined period of time before the occurrence time of the abnormality log to minutes defined in a predetermined period of time after the occurrence time of the abnormality log. The predetermined period of time before an abnormality log occurrence time and the predetermined period of time after the abnormality log occurrence time may be different from each other. The reference log can also be expressed as information about a normal pattern that matches a structural pattern occurring within a second time including the occurrence time of the abnormality log.

The reference log is expressed as a combination of an abnormal pattern ID corresponding to an abnormality log and a normal pattern ID corresponding to that abnormal pattern ID. A reference log recorded in the pattern storage unit 31 will be referred to as a first reference log, and a reference log extracted by the normal analysis unit 51 when an abnormality log occurs will be referred to as a second reference log.

FIG. 5 illustrates a reference log table 143 which is an example of a reference log. For example, when an abnormality log corresponding to the abnormal pattern "1" occurs, it is assumed that the normal pattern "10, 11, 12" have occurred with the abnormality log. At this time, the normal pattern "10, 11, 12" that occurred accompanying the abnormality log is the reference log. In the reference log table 143, "10, 11, 12" is recorded as the reference log in association with the abnormal pattern "1".

The pattern storage unit 31 is referred to by the normal analysis unit 51 and the abnormality analysis unit 52. The pattern storage unit 31 stores a new abnormal pattern generated by the abnormal pattern generation unit 71 and a reference log corresponding to the new abnormal pattern.

{Condition Storage Unit}

The condition storage unit 35 stores a determination condition 45 (hereinafter referred to as a determination condition) which is a condition for generating an abnormal pattern. The determination condition is set as, for example, a condition such as a time of a log and similarity of a log. It should be noted that the condition storage unit 35 may be the same storage apparatus as the pattern storage unit 31 or may be a different storage apparatus.

{Normal Analysis Unit}

The normal analysis unit 51 receives a plurality of log messages from the log reading unit 21. When receiving the log, the normal analysis unit 51 refers to the pattern storage unit 31, and compares the structural pattern in the received log with the normal pattern recorded in the pattern storage unit 31. Then, the normal analysis unit 51 analyzes whether or not the structural pattern in the received log matches the normal pattern. The normal analysis unit 51 outputs an analysis result to the result output unit 91.

When the structural pattern of the received log does not match the normal pattern, the normal analysis unit 51 outputs the log as an abnormality log to the abnormality analysis unit 52. At this time, the normal analysis unit 51 outputs the normal pattern occurring with the abnormality log as reference information in the abnormality log. The details of the normal analysis unit 51 will be described later.

{Abnormality Analysis Unit}

The abnormality analysis unit 52 receives an abnormality log and reference information attached to the abnormality log from the normal analysis unit 51. Upon receiving the abnormality log, the abnormality analysis unit 52 refers to the pattern storage unit 31, and compares the structural pattern in the received abnormality log with the abnormal pattern 42 recorded in the pattern storage unit 31. Then, the abnormality analysis unit 52 analyzes whether or not the structural pattern in the received abnormality log matches the recorded abnormal pattern. The abnormality analysis unit 52 outputs the analysis result to the result output unit 91.

When the abnormality analysis unit 52 determines that the structural pattern in the abnormality log does not match the abnormal pattern, the abnormality analysis unit 52 outputs the abnormality log and the reference information attached to the abnormality log to the abnormal pattern generation unit 71. The details of the abnormality analysis unit 52 will be described later.

{Abnormal Pattern Generation Unit}

The abnormal pattern generation unit 71 receives an abnormality log and reference information attached to the abnormality log from the abnormality analysis unit 52. The abnormal pattern generation unit 71 generates an abnormal pattern from the received abnormality log according to the determination condition recorded in the condition storage unit 35. The abnormal pattern generation unit 71 transmits the generated abnormal pattern to the pattern storage unit 31, and records the abnormal pattern in the pattern storage unit 31.

For example, when inputting the determination condition in the abnormal pattern generation unit 71, the abnormal pattern generation unit 71 may be structured so that the administrator directly inputs the determination condition with an input unit (not shown). The abnormal pattern generation unit 71 may be structured so as to read a file defining the determination condition with an input unit (not shown). The abnormal pattern generation unit 71 may be configured to receive an input of an abnormal pattern defined by the administrator with an input unit (not shown) and to directly record the abnormal pattern in the pattern storage unit 31.

{Result Output Unit}

The result output unit 91 receives the analysis result of the normal analysis unit 51 and the abnormality analysis unit 52 and outputs the received analysis result.

When the result output unit 91 receives an analysis result indicating that the structural pattern of the log of the analysis target matches the normal pattern, the result output unit 91 outputs the log in association with the normal pattern. When the result output unit 91 receives an analysis result that the structural pattern of the log of the analysis target matches the abnormal pattern, the result output unit 91 outputs the log in association with the abnormal pattern. The output format of the result output unit 91 is not limited thereto.

The above is the explanation about the structure of the log analysis system according to the present example embodiment.

[Operation]

Subsequently, the operation of the log analysis system 11 according to the present example embodiment will be explained along the flow chart of FIG. 6. In the following explanation, the transmission and reception of data between structural elements constituting log analysis system 11 may be omitted.

Figure 6:
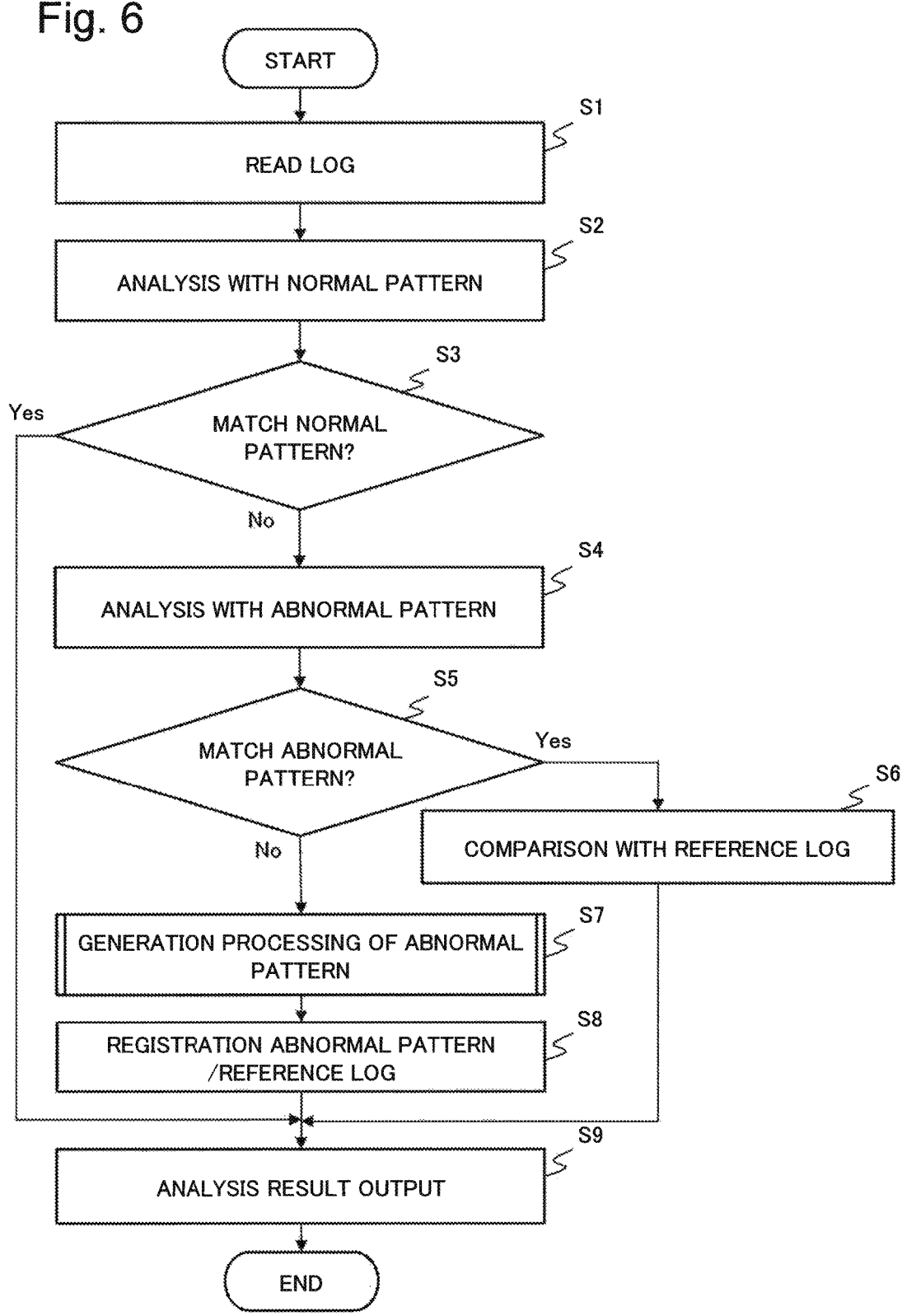
FIG. 6 is a flowchart about an operation of a log analysis system according to the first example embodiment of the present invention.

In FIG. 6, first, the log reading unit 21 reads the input log file (FIG. 6: step S1).

Subsequently, the normal analysis unit 51 analyzes the read log file (FIG. 6: step S2). For example, the normal analysis unit 51 compares the combination or the chronological order of the log IDs of the respective log messages included in the read log file with the normal pattern recorded in the pattern storage unit 31.

When the structural pattern of the log message group included in the input log file matches the normal pattern (Yes in step S3), the normal analysis unit 51 outputs to the result output unit 91 an analysis result indicating that the inputted log is normal (FIG. 6: step S9 is subsequently performed).

Hereinafter, an example in which the structural pattern of the input log message group matches the normal pattern will be explained with reference to FIG. 7. For example, the chronological order of the normal pattern is "1→2→3→4", and the prescribed time is "10 seconds". At this time, the log message detected in 10 seconds from the reading time "2014/12/10 10:00:34" to "2014/12/10 10:00:44" of the log message "1" is the log of the analysis target.

Figure 7:
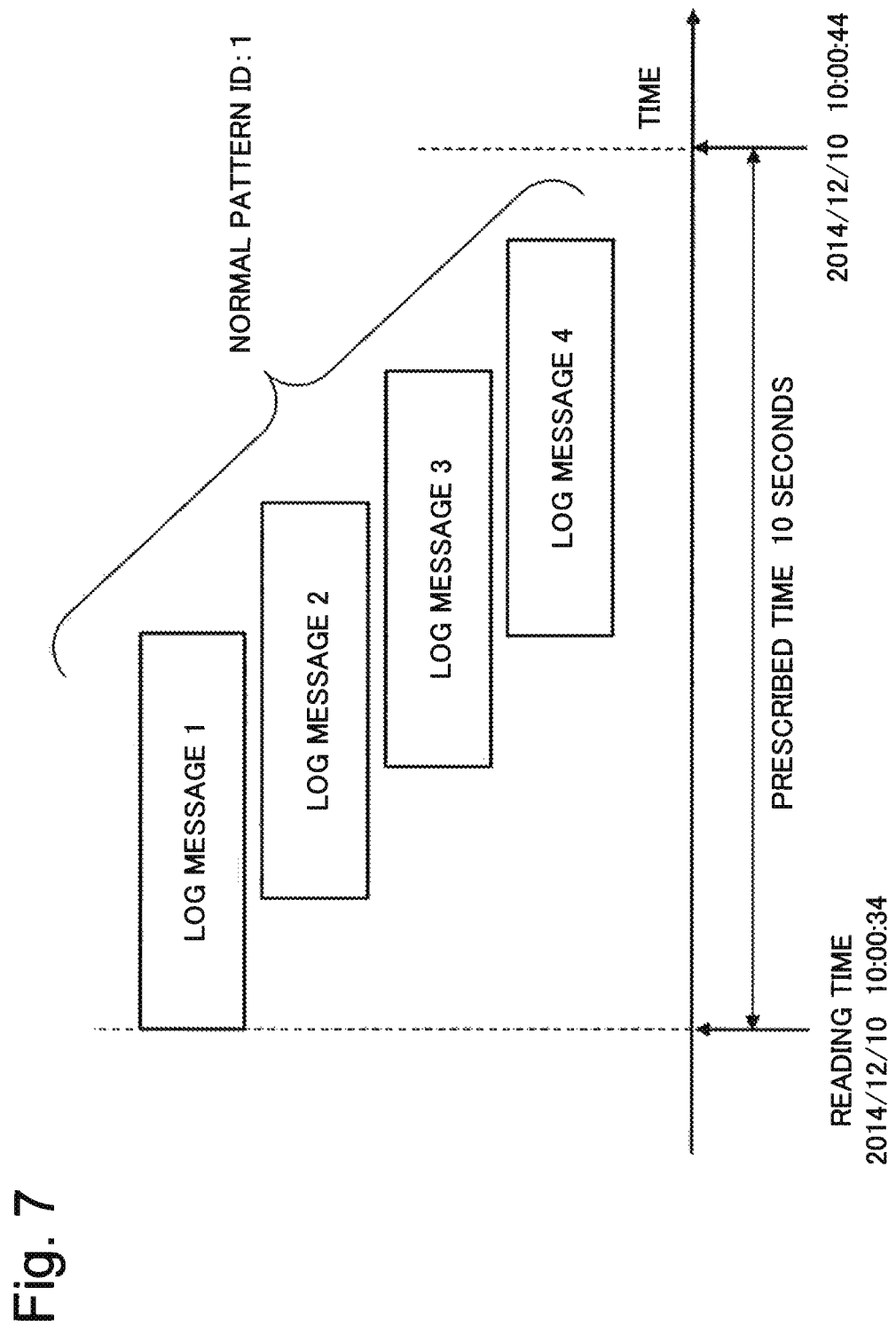
FIG. 7 is a conceptual diagram about a normal pattern handled by the log analysis system according to the first example embodiment of the present invention.

As shown in FIG. 7, if all the log messages constituting the normal pattern are detected in the chronological order before the prescribed time elapses since the reading time of the log message "1", the normal analysis unit 51 determines that the log file containing the log message group is normal.

On the other hand, when the structural pattern of the log message group included in the input log file does not match the normal pattern (FIG. 6: No in step S3), the normal analysis unit 51 transmits the log message group as the abnormality log to the abnormality analysis unit 52. More specifically, the normal analysis unit 51 transmits to the abnormality analysis unit 52 the log not satisfying all the elements contained in the normal pattern within the prescribed time as an abnormality log (step S4 is subsequently performed). At the same time, the normal analysis unit 51 outputs to the result output unit 91 an analysis result that the input log file contains an abnormal pattern (FIG. 6: step S9 is subsequently performed). Thereafter, the log which did not satisfy all the elements contained in the normal pattern within the prescribed time will be referred to as an incomplete log.

In this case, an example in which the structural pattern of the log message group included in the input log file does not match the normal pattern will be explained with reference to FIG. 8. For example, the prescribed time of the normal pattern whose chronological order is "1→2→3→4" is assumed to be "10 seconds". Further, the reading time of the log message "1" is assumed to be "2014/12/10 10:00:34".

Figure 8:
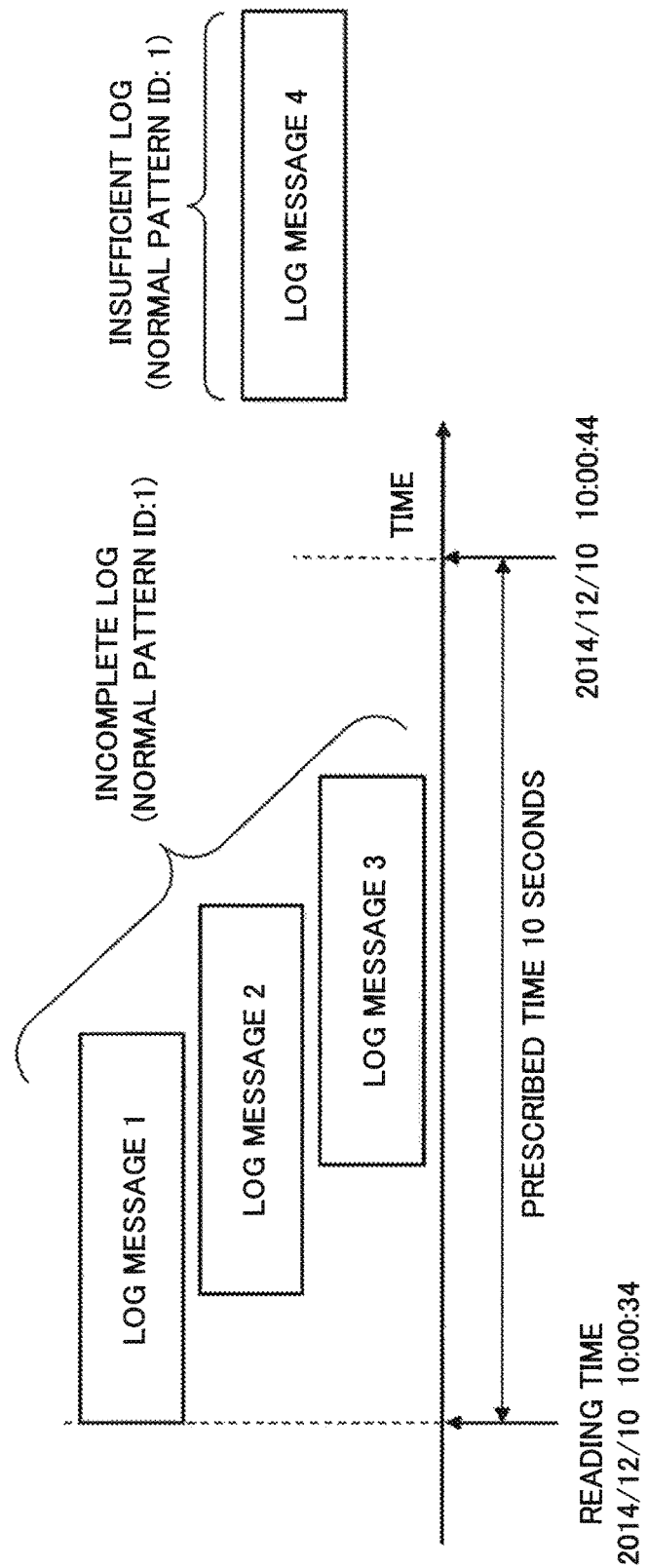
FIG. 8 is a conceptual diagram about an incomplete log handled by the log analysis system according to the first example embodiment of the present invention.

As shown in FIG. 8, the log messages "1→2→3" partially matches a part of the normal pattern from the reading time of log message "1" to "2014/12/10 10:00:44" which is 10 seconds later, but if the log message "4" does not appear, the normal analysis unit 51 determines that the prescribed time has been exceeded. Upon receiving the result, the normal analysis unit 51 transmits the log message group corresponding to "1→2→3" matching a part of the normal pattern within the prescribed time as an incomplete log to the abnormality analysis unit 52.

The normal analysis unit 51 transmits the information about the normal pattern corresponding to the incomplete log as information attached to the incomplete log. When the incomplete log corresponds to normal pattern "1" as shown in, for example, FIG. 8, the normal analysis unit 51 transmits the information indicating that the log corresponds to the normal pattern "1" to the abnormality analysis unit 52.

With regard to the abnormality log, the normal analysis unit 51 may transmit to the abnormality analysis unit 52 information about an insufficient log in order to satisfy the normal pattern. Thereafter, in the structural pattern of the log message of the analysis target, a missing log that is missing to complete the normal pattern will be referred to as the insufficient log. For example, as shown in FIG. 8, when only the log message "4" does not exist in the normal pattern "1→2→3→4", the normal analysis unit 51 transmits information about the log message "4" in addition to the incomplete log ("1→2→3") to the abnormality analysis unit 52 as the insufficient log.

Figure 9:
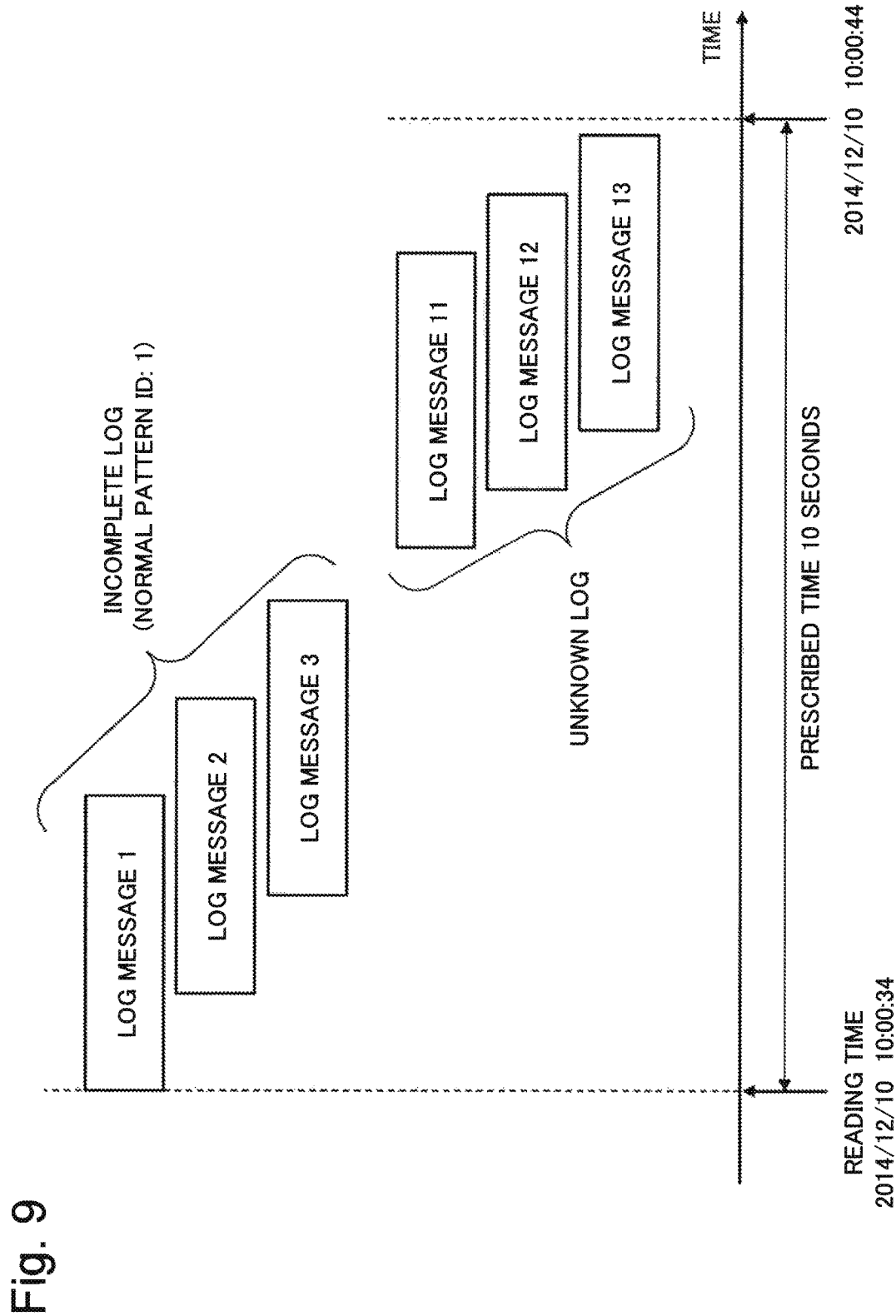
FIG. 9 is a conceptual diagram about an unknown log handled by the log analysis system according to the first example embodiment of the present invention.

Further, when a log message not included in the log message constituting the normal pattern is detected in the input log message, the normal analysis unit 51 transmits the log to the abnormality analysis unit 52. Hereafter, in abnormality log, a log message which is not included in the log message constituting the normal pattern will be referred to as an unknown log. For example, when the incomplete log "1→2→3" as well as a log message "11→12→13" that is not included in the normal pattern is detected from the abnormality log as shown in FIG. 9, the normal analysis unit 51 transmits the incomplete log "1→2→3" to the abnormality analysis unit 52. At the same time, the normal analysis unit 51 transmits the information about "11→12→13" as an unknown log to the abnormality analysis unit 52.

In other words, the abnormality log can be defined as supplementary information about an unknown log, an incomplete log, and a normal pattern matching the logs, an insufficient log, and the like.

When the abnormality log is transmitted to the abnormality analysis unit 52, the normal analysis unit 51 adopts, as a reference log, information about a normal pattern matching a log detected within a reference analysis time separately defined from the occurrence time of the abnormality log, and transmits the reference log to the abnormality analysis unit 52. The reference analysis time is the time defined to determine the reference log. For example, the reference analysis time is set before and after the abnormality log occurrence time.

Figure 10:
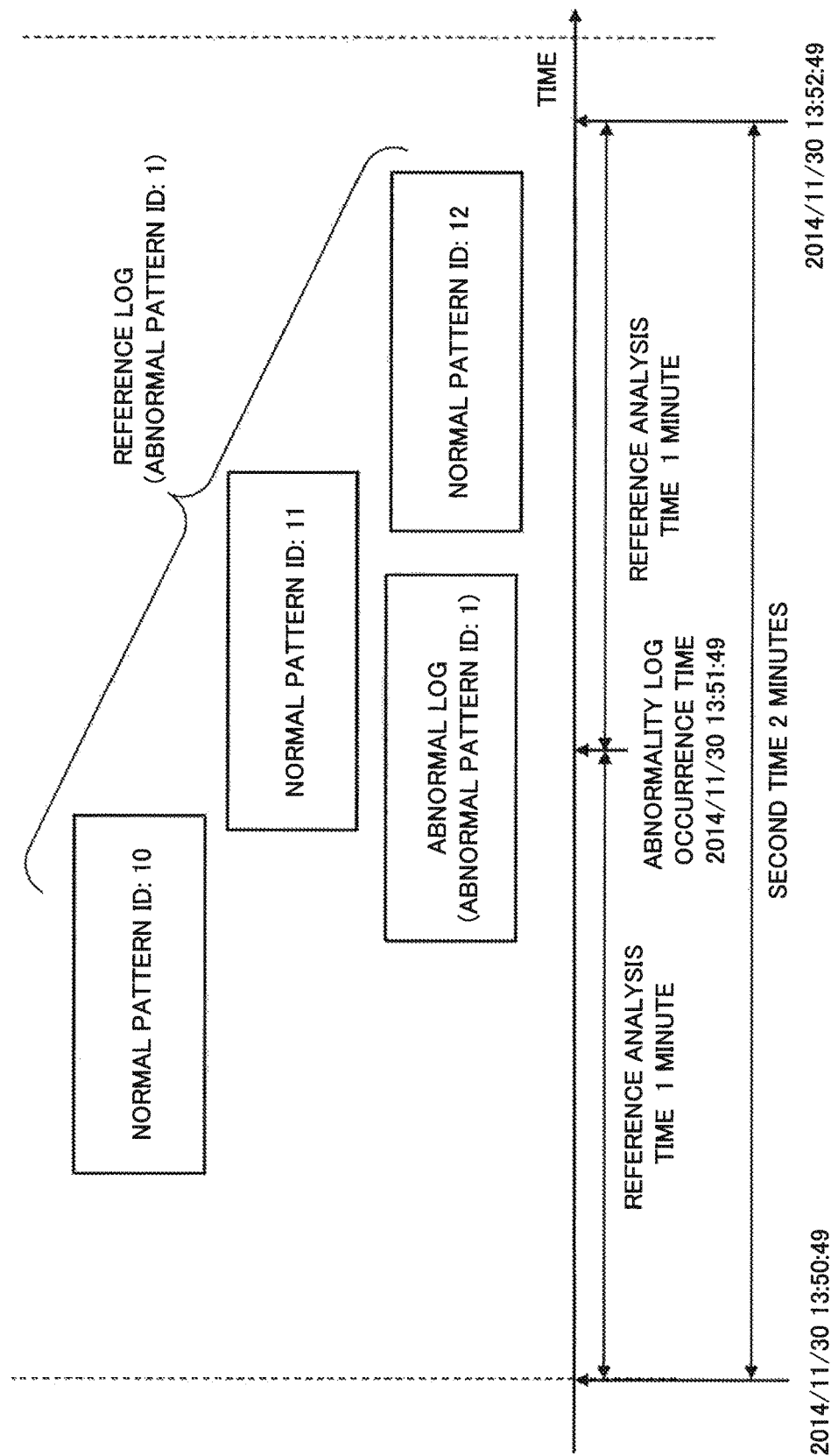
FIG. 10 is a conceptual diagram about a reference log handled by the log analysis system according to the first example embodiment of the present invention.

FIG. 10 shows a conceptual diagram for explaining the reference log. For example, suppose that the reference analysis time is "1 minute", and an abnormality log to be given an abnormal pattern ID "1" occurs at an abnormality log occurrence time "2014/11/30 13:51:49". More specifically, the period of time from "2014/11/30 13:50:49" which is one minute before the abnormality log occurrence time to "2014/11/30 13:52:49" which is after two minutes corresponds to the second time. At this occasion, a normal pattern that matches the structural pattern of the log message group detected in the second time is determined to be the reference log for the abnormality log. In the example of FIG. 10, in the logs occurring within the second time from "2014/11/30 13:50:49" to "2014/11/30 13:51:49", a normal pattern having pattern IDs "10", "11", "12" corresponds to the reference log.

In the above example, the time section for determining the reference log is defined as a time section from a time before the abnormality log occurrence time by the reference analysis time to a time after the abnormality log occurrence time by the reference analysis time. Alternatively, the abnormality log occurrence time may be defined as a start point or an end point of the section, e.g., the time section may be defined as a time section from a time before the abnormality log occurrence time by the reference analysis time to the abnormality log occurrence time, or the time section may be defined as a time section from the abnormality log occurrence time to a time after the reference analysis time has elapsed.

The normal analysis unit 51 transmits a set of pattern IDs for identifying the normal pattern as a reference log. For example, as shown in FIG. 10, if a normal pattern having pattern IDs "10, 11, 12" is determined to be the reference log when an abnormality log occurs, the normal analysis unit 51 transmits "10, 11, 12" as the reference log to the abnormality analysis unit 52.

A point in time at which the normal analysis unit 51 transmits the abnormality log and the reference log on the abnormality log to the abnormality analysis unit 52 may be a point in time at which the abnormality log is detected by analysis. The normal analysis unit 51 may collectively transmit the abnormality logs detected so far to the abnormality analysis unit 52 at the time when the analysis of all the input logs is completed. Alternatively, when any abnormality log does not occur until any given time after a certain period of time defined separately elapsed since the abnormality log occurs, the normal analysis unit 51 may transmit, to the abnormality analysis unit 52, an abnormality log that occurred from a previous transmission time to any given time.

Subsequently, the abnormality analysis unit 52 analyzes the abnormality log received from the normal analysis unit 51 (FIG. 6: step S4). More specifically, the abnormality analysis unit 52 compares the structural pattern of the abnormality log received from the normal analysis unit 51 with the abnormal pattern recorded in the pattern storage unit 31.

When the structural pattern and the abnormal pattern of the abnormality log match each other (FIG. 6: Yes in step S5), the abnormality analysis unit 52 compares the reference log received from the normal analysis unit 51 with the reference log corresponding to the abnormal pattern recorded in the pattern storage unit 31 (FIG. 6: step S6). The reference log corresponding to the abnormal pattern recorded in the pattern storage unit 31 corresponds to the first reference log, and the reference log received from the normal analysis unit 51 corresponds to the second reference log.

For example, the second reference log corresponding to abnormal pattern ID "101" is assumed to be "31, 48, 129". At this time, the abnormality log matches the abnormal pattern having the abnormal pattern ID "101", and the first reference log corresponding to the abnormality log is assumed to be "31, 129, 534". In this case, as a result of comparing the first reference log corresponding to the abnormality log and the second reference log corresponding to the abnormal pattern ID "101", the abnormality analysis unit 52 determines that "31, 129" matches.

Then, the abnormality analysis unit 52 transmits, to the result output unit 91, an analysis result indicating that the abnormal pattern of the abnormal pattern ID "101" occurs, and the reference log matching the second reference log corresponding to the abnormal pattern is "31, 129" (FIG. 6: step S9 is subsequently performed).

On the other hand, when the structural pattern and the abnormal pattern of the abnormality log do not match each other (FIG. 6: No in step S5), the abnormality analysis unit 52 transmits the abnormality log and the second reference log corresponding to the abnormality log to the abnormal pattern generation unit 71 (FIG. 6: step S7 is subsequently performed). At the same time, the abnormality analysis unit 52 sends an abnormality log to the result output unit 91. At this time, the abnormality analysis unit 52 may transmit the abnormality log and the reference log corresponding to the abnormality log to the result output unit 91.

Subsequently, the abnormal pattern generation unit 71 generates a new abnormal pattern from the abnormality log received from the abnormality analysis unit 52, based on the determination condition recorded in the condition storage unit 35 (FIG. 6: step S7). The processing of step S7 will be described later in details.

Subsequently, the pattern storage unit 31 registers a new abnormal pattern and a reference log corresponding to the new abnormal pattern in the pattern storage unit 31 (FIG. 6: step S8).

Then, the result output unit 91 outputs the result received from the normal analysis unit 51 and the abnormality analysis unit 52 (FIG. 6: step S9). The result output unit 91 may output the results received from the normal analysis unit 51 and the abnormality analysis unit 52 individually or in combination.

{Abnormal Pattern Generation Processing}

In this case, the processing (which will be referred to as abnormal pattern generation processing) in step S7 in FIG. 6 will be described in details with reference to the flowchart in FIG. 11.

Figure 11:
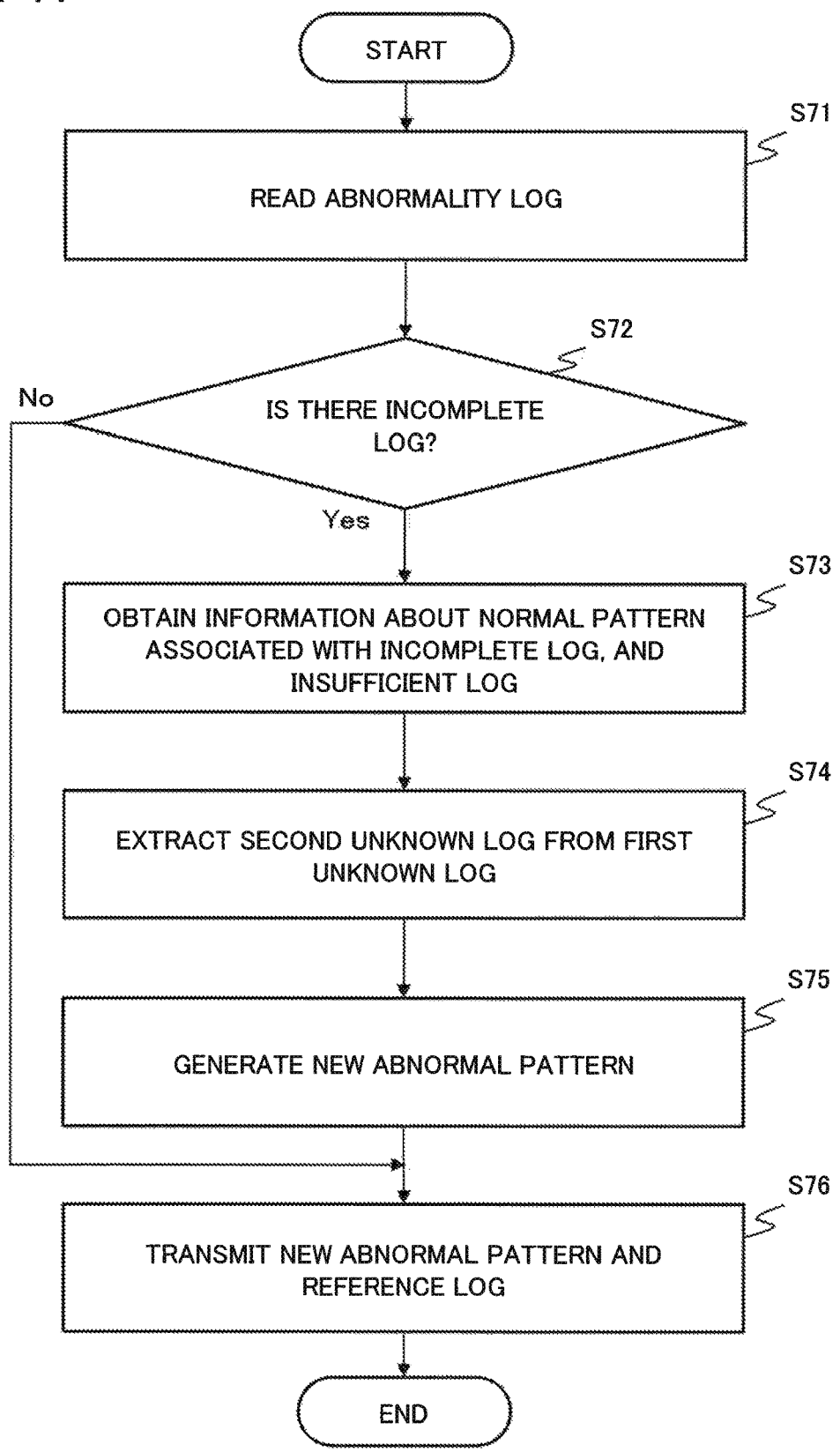
FIG. 11 is a flowchart about abnormal pattern generation processing performed by an abnormal pattern generation unit of the log analysis system according to the first example embodiment of the present invention.

In FIG. 11, first, the abnormal pattern generation unit 71 reads the abnormality log from the abnormality analysis unit 52 (FIG. 11: step S71).

In a case where the incomplete log is not included in the abnormality log (FIG. 11: No in step S72), the abnormal pattern generation unit 71 transmits its abnormality log as a new abnormal pattern to the pattern storage unit 31 and transmits a corresponding reference log to the pattern storage unit 31 (FIG. 11: step S76). The abnormal pattern and the reference log transmitted to the pattern storage unit 31 are stored in the pattern storage unit 31.

On the other hand, when the incomplete log is included in the abnormality log (FIG. 11: Yes in step S72), the abnormal pattern generation unit 71 acquires the information about the normal pattern and the insufficient log corresponding to the incomplete log (FIG. 11: step S73).

For example, when the incomplete log contained in the abnormality log is "123", and the normal pattern corresponding to the abnormality log is "1→2→3→4", the insufficient log is "4".

Subsequently, the abnormal pattern generation unit 71 extracts the unknown log (second unknown log) corresponding to the incomplete log from the unknown log (first unknown log) included in the abnormality log according to the determination condition (FIG. 11: step S74).

The determination condition is a condition for determining the incomplete log and the unknown log corresponding to the incomplete log. It should be noted that the first unknown log means a log message which is of the log messages constituting abnormality log and which is not included in the incomplete log. In other words, it can be said that the unknown log is a set of first unknown logs. A log message which is of the first unknown logs and which satisfies the determination condition is referred to as the second unknown log, and the log message which is of the first unknown logs and which does not satisfy the determination condition is referred to as the third unknown log.

Figure 12:
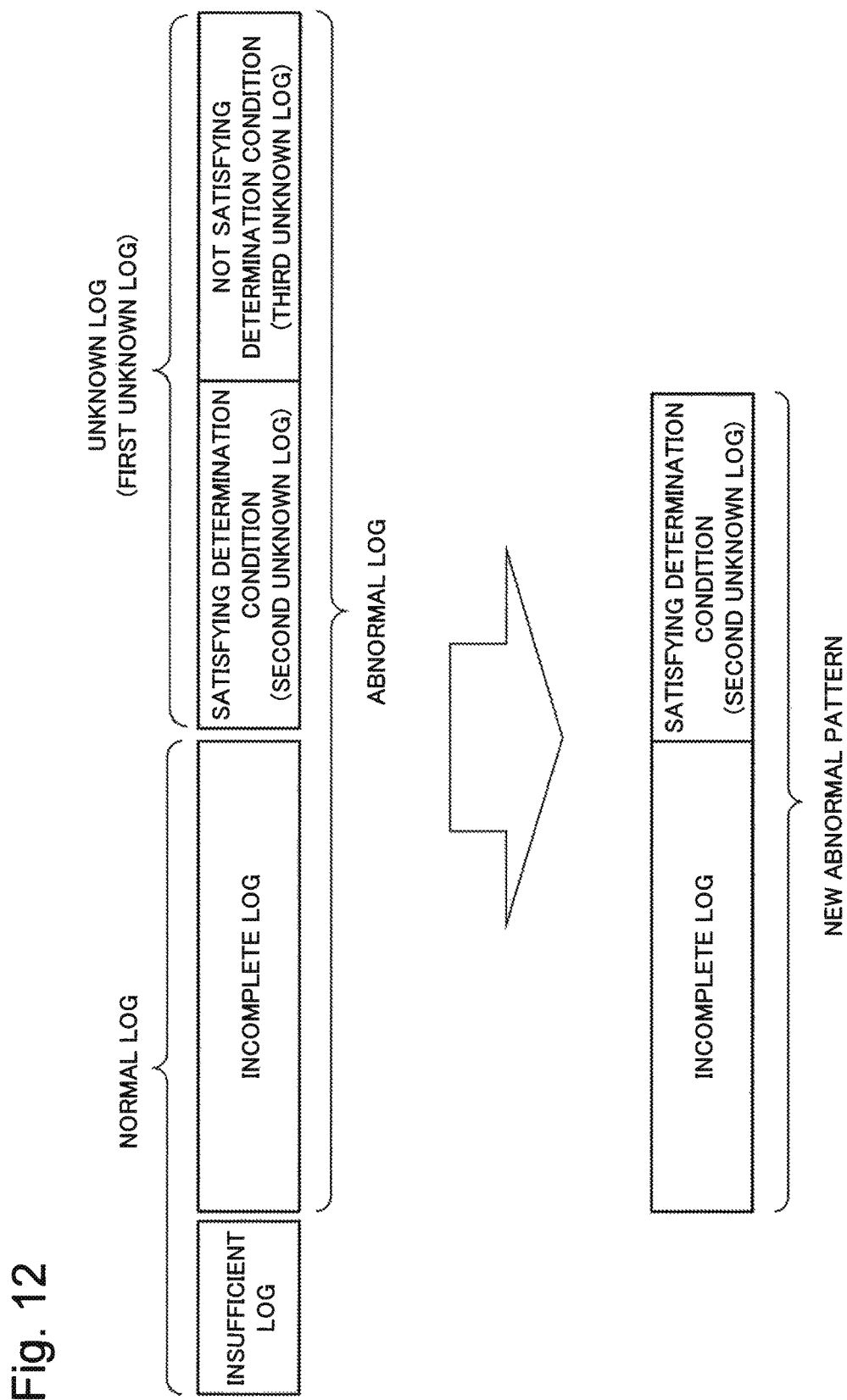
FIG. 12 is a conceptual diagram about an abnormality log handled by the log analysis system according to the first example embodiment of the present invention.

In this case, a conceptual diagram for explaining the structure of the incomplete log, the unknown log, and the insufficient log is shown in FIG. 12. An upper side of FIG. 12 shows the structure of an abnormality log, and a lower side of FIG. 12 shows the structure of a new abnormal pattern generated from the abnormality log. The normal log is constituted by the incomplete log and the insufficient log. The abnormality log is constituted by the incomplete log and the second unknown log.

For example, it may be determined that, if a time (hereinafter referred to as a determination time) is specified as the determination condition, the unknown log existing within the range of the determination time (also referred to as a third time) from the occurrence time of the incomplete log is included in the second unknown log. The occurrence time of the incomplete log may be any one of the times within the range between the earliest time and the latest time of the times of the log messages included in the incomplete log.

Figure 13:
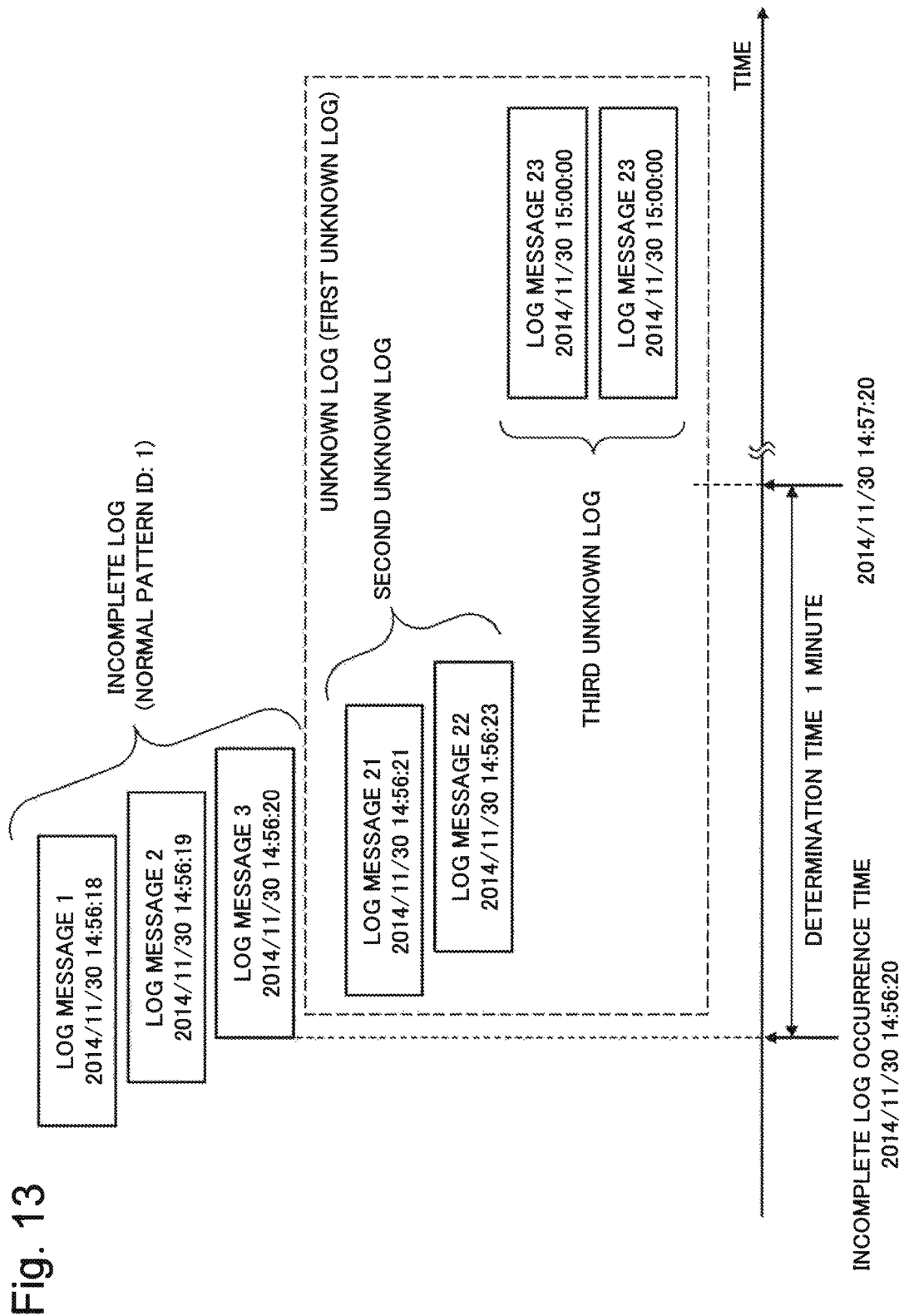
FIG. 13 is a conceptual diagram about a determination time in the log analysis system according to the first example embodiment of the present invention.

In this case, the unknown log will be explained with reference to FIG. 13. FIG. 13 shows the occurrence times of log messages. For example, suppose that the latest time of the logs included in the incomplete log is "2014/11/30 14:56:20", and the determination condition is "1 minute". In this case, the latest time "2014/11/30 14:56:20" of the logs included in the incomplete log is assumed to be the occurrence time of the incomplete log. At this occasion, the unknown logs are assumed to have occurred at "2014/11/30 14:56:21", "2014/11/30 14:56:23", "2014/11/30 15:00:00", "2014/11/30 15:00:00". At the four times, the logs satisfying the determination condition are the logs that occurred at "2014/11/30 14:56:21" and "2014/11/30 14:56:23". Therefore, the abnormal pattern generation unit 71 extracts the logs (the logs that occurred at "2014/11/30 14:56:21" and "2014/11/30 14:56:23") as the second unknown log.

For example, when similarity of logs is defined as the determination condition, the abnormal pattern generation unit 71 determines similarity between the incomplete log or the insufficient log and the unknown log, and determines that the unknown log in the first unknown log that satisfies the condition of the similarity defined in the determination condition is the second unknown log.

For example, in order to determine the similarity, the abnormal pattern generation unit 71 compares the character string included in the log message using a value such as an edit distance. At this time, the abnormal pattern generation unit 71 determines that a log message where the edit distance satisfies the threshold value condition is a similar log message.

For example, the abnormal pattern generation unit 71 may generate a feature vector having a word as one dimension based on words included in the log message and determine the similarity of the logs based on the distance between the feature vectors. At this time, the abnormal pattern generation unit 71 determines, as a similar log message, a log message where a distance between the feature vectors is equal to or less than a certain value. For example, Euclidean squared distance, Minkowski distance, Mahalanobis' general distance, and the like can be used as the distance between feature vectors.

The abnormal pattern generation unit 71 may previous prepare a dictionary such as a host name, an application name, a log file name, and the like, and may determine that a log message including the same word or a log message output from the same host or application is a similar message.

For example, a determination condition indicating that a log output from the same host as the host that output the insufficient log is adopted as second unknown log is defined. Suppose that, for the normal pattern "1→2→3→4", the insufficient log is "4", and this insufficient log is output from a host "vm001". In a case where the first unknown log includes the logs output from "vm001", "vm002", and "vm003", the abnormal pattern generation unit 71 extracts the log output from "vm001" as the second unknown log.

However, the abnormal pattern generation unit 71 may perform determination using both the time and the similarity as the determination condition, or may use the determination condition that is not the time or the similarity.

Subsequently, the abnormal pattern generation unit 71 combines the incomplete log and the second unknown log corresponding to the incomplete log to generate a new abnormal pattern (FIG. 11: step S75). It should be noted that the abnormal pattern generation unit 71 separately transmits the third unknown log to the result output unit 91.

For example, in a case where the incomplete log is "1→2→3", and the second unknown log is "101, 235", the abnormal pattern is "1→2→3→101→235". This example is an example for describing an abnormal pattern, and an abnormal pattern may be described as an automaton, or only the relation between the incomplete log and the second unknown log may be recorded and stored separately.

Finally, the abnormal pattern generation unit 71 transmits a new abnormal pattern and a reference log corresponding to the new abnormal pattern to the pattern storage unit 31 to store the new abnormal pattern and the reference log in the pattern storage unit 31 (FIG. 11: step S76).

The above is an explanation of the operation related to the log analysis system according to the present example embodiment.

{Result Output Screen}

In this case, an example of an output result output from the result output unit 91 is shown.

Figure 14:
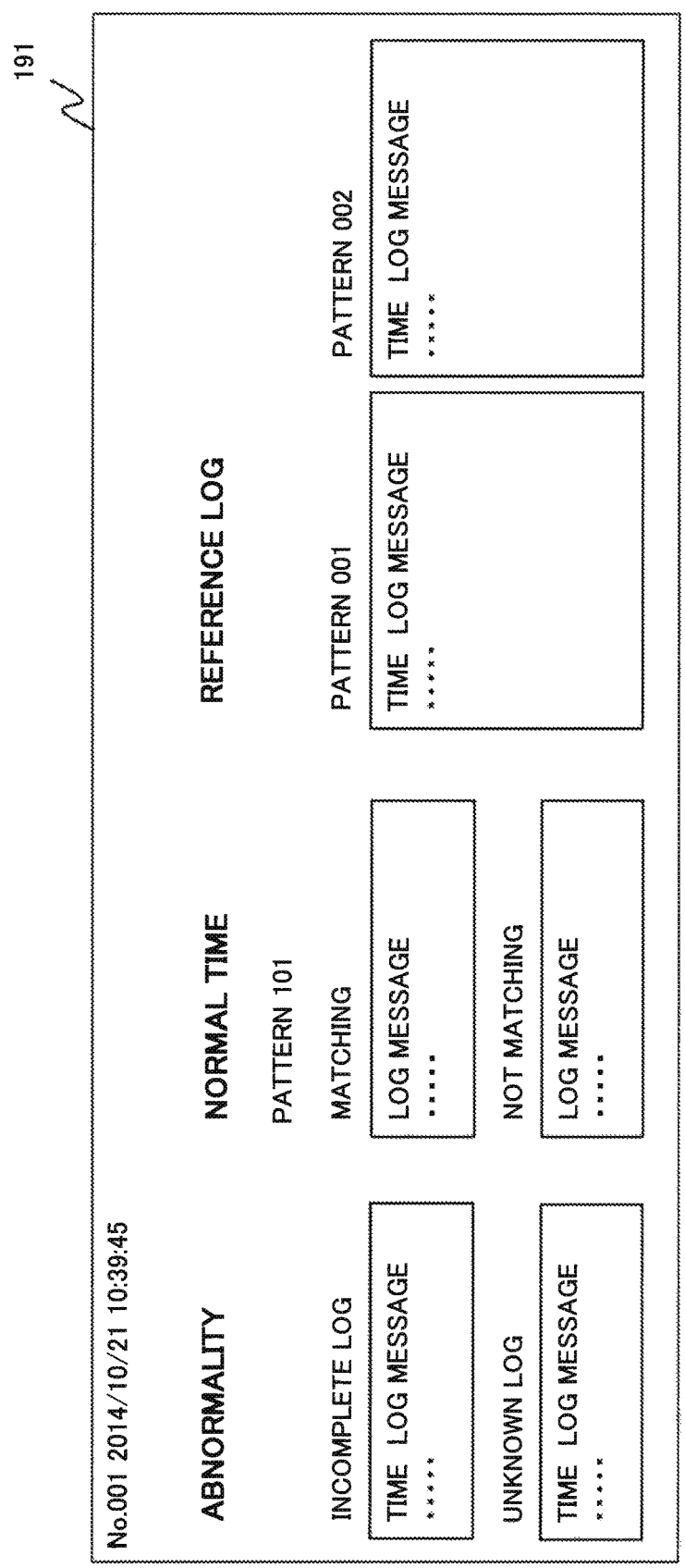
FIG. 14 is a figure illustrating an example an analysis result according to the first example embodiment of the present invention.

FIG. 14 shows an example of an output result (output result screen 191) of an abnormality detected using a normal pattern. The output result screen 191 of FIG. 14 displays an output result including the occurrence time of the abnormality, the incomplete log and the unknown log as the content of the abnormality, the normal pattern and the insufficient log corresponding to the incomplete log, information about the reference log.

Figure 15:
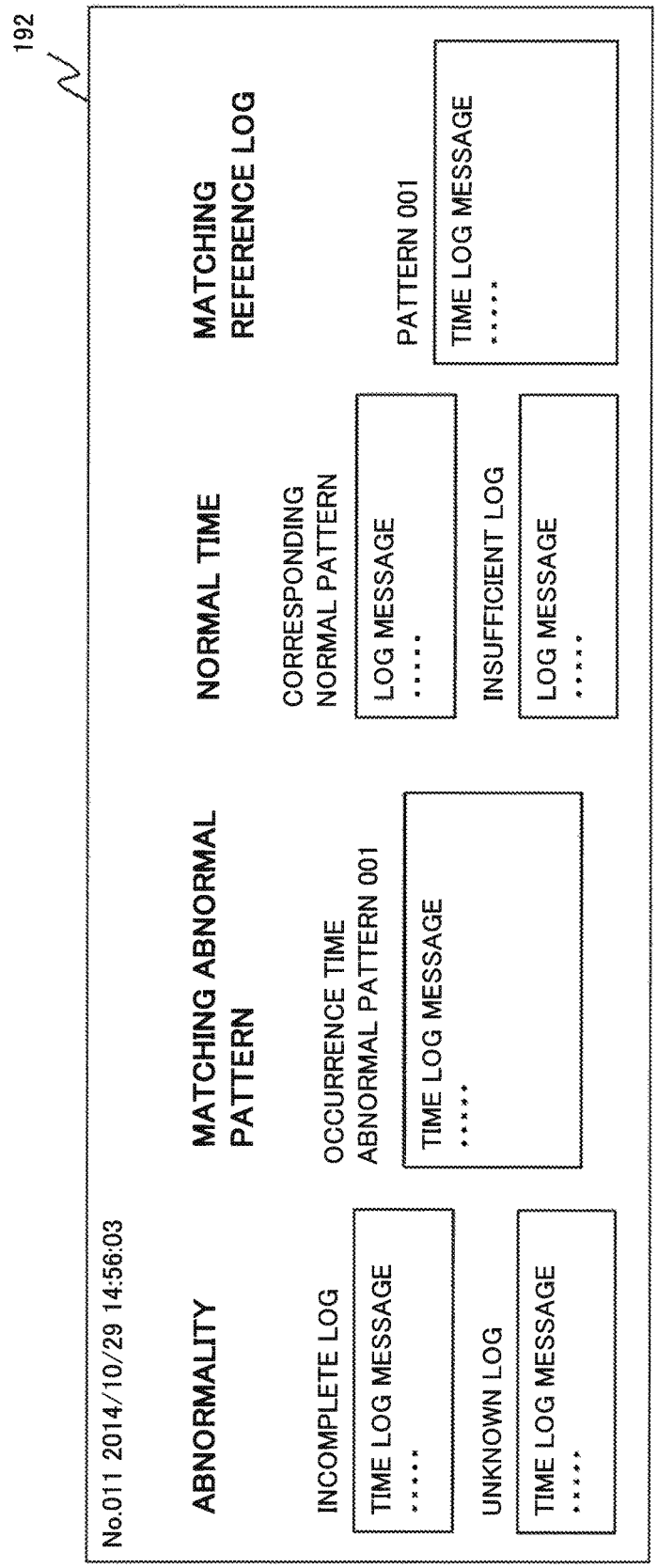
FIG. 15 is a figure illustrating an example of an analysis result according to the first example embodiment of the present invention.

FIG. 15 illustrates an example (output result screen 192) of an output result of abnormality detected using the abnormal pattern. An output result including the occurrence time of the abnormality, the incomplete log and the unknown log serving as the content of the abnormality, the matching abnormal pattern, the normal pattern and the insufficient log corresponding thereto, and information about the reference log matching the reference log of the abnormal pattern are output on the output result screen 192 of FIG. 15. The result output unit 91 separately outputs the third unknown log received from the abnormal pattern generation unit 71.

The above is the explanation about the operation of log analysis system 11 according to the present example embodiment. The log reading unit 21, the normal analysis unit 51, the abnormality analysis unit 52, and the abnormal pattern generation unit 71 may receive an instruction to log analysis start with a user or another program or software from an input apparatus (not shown), and may start operation upon receiving the instruction. The log reading unit 21, the normal analysis unit 51, the abnormality analysis unit 52, and the abnormal pattern generation unit 71 may start the operation upon inputting or updating of the log file.

[Advantages]

According to the log analysis system according to the present example embodiment explained above, even if there is no prior information about failure, the logs concerning the failure contained in the logs can be appropriately extracted, and the extracted log can be stored as a pattern for failure detection. The reason for this is that the log analysis system can extract a series of logs deviating from the normal pattern based on the normal pattern and record the extracted series of logs as an abnormal pattern.

The log analysis system according to the present example embodiment can specify with a high degree of accuracy as to whether an occurred failure matches a failure occurred in the past. The reason for this is that the log analysis system according to the present example embodiment can store a series of logs deviating from the normal pattern as an abnormal pattern, and can determine whether or not the logs about the failure of the analysis target match the abnormal pattern.

The log analysis system according to the present example embodiment can support analysis of failure with the administrator. The first reason is that if there is a log deviating from the normal pattern due to occurrence of the failure, the log analysis system can present, to the administrator, the normal log occurring supplementary to the failure in association with the failure. The second reason is that, when a new failure occurs, the log analysis system can present to the administrator the occurrence situation of the normal log that occurred together with the failure occurrence in the past.

The log analysis system according to the present example embodiment can correctly identify that abnormal log messages are the same but are failures different as events. The reason for this is that the log analysis system according to the present example embodiment uses the normal pattern to determine the abnormality of not only abnormal log messages but also a log message partially matching a normal pattern.

(Second Example Embodiment)

Subsequently, a log analysis system 12 according to the second example embodiment of the present invention will be explained with reference to drawings.

Figure 16:
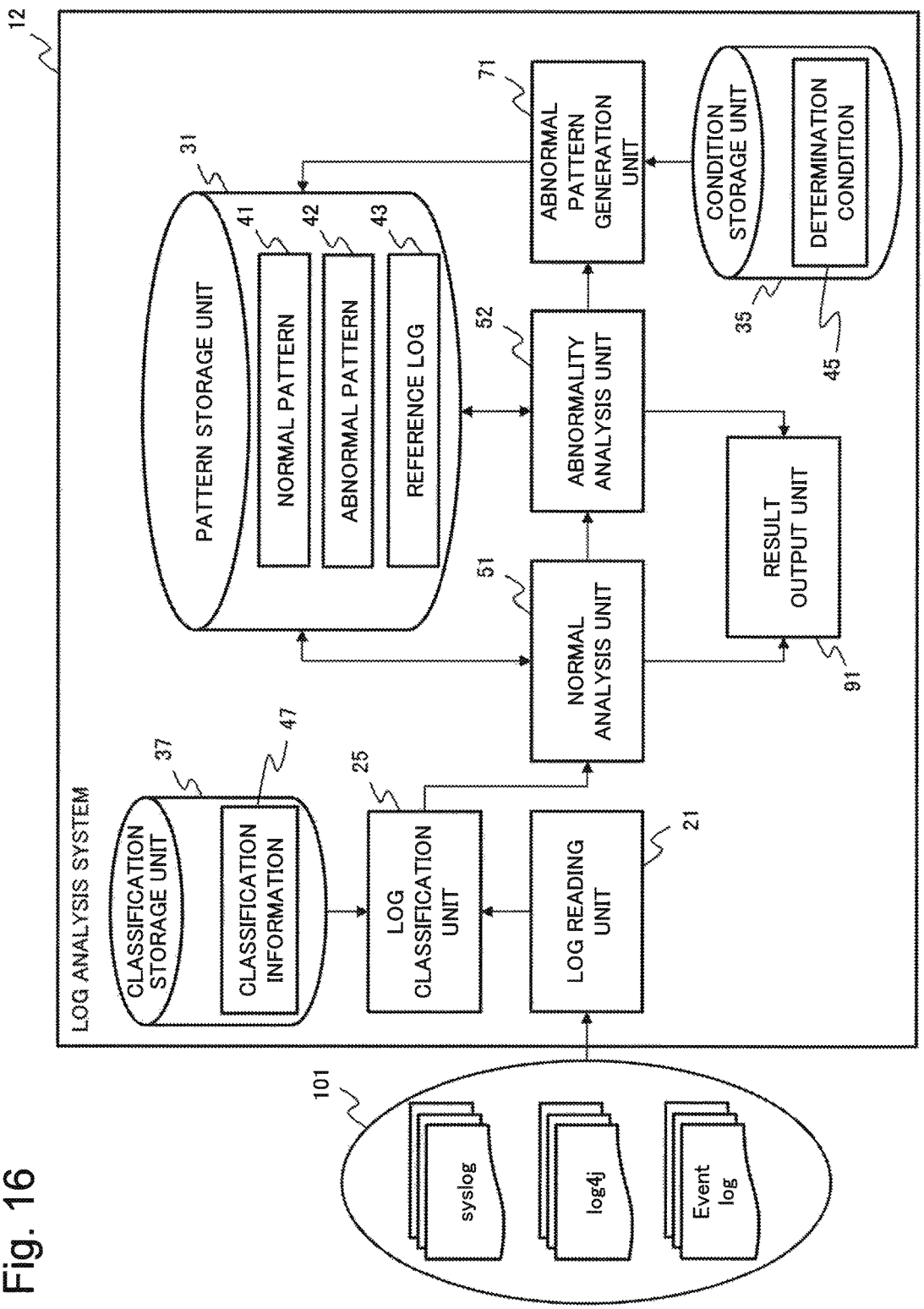
FIG. 16 is a block diagram illustrating a structure of a log analysis system according to a second example embodiment of the present invention.

FIG. 16 is a block diagram illustrating a structure of the log analysis system 12 according to the present example embodiment. The log analysis system 12 according to the present example embodiment has a structure in which a log classification unit 25 and a classification storage unit 37 are added to the structure of the log analysis system 11 according to the first example embodiment. In FIG. 16, structures substantially the same as those in FIG. 1 are given the same reference numerals, and a detailed explanation thereabout is omitted.

The log classification unit 25 receives logs from the log reading unit 21. The log classification unit 25 assigns an identifier (hereinafter referred to as "log ID") capable of uniquely identify each log message included in the received log. In addition, the log classification unit 25 records the correspondence between the log ID and the log message in the classification storage unit 37.

The classification storage unit 37 records classification information 47 (hereinafter referred to as classification information) defining the correspondence between the log ID and the log message.

FIG. 17 shows an example of classification information (classification information table 147). The classification information includes a log ID and a log message corresponding to the log ID. A log message may be defined as it is, or it may be defined using regular expression or the like.

Subsequently, the operation of the log classification unit 25 will be described.

First, the log classification unit 25 refers to the classification information stored in the classification storage unit 37 for the log message included in the log received from the log reading unit 21, and verifies the existence of the log ID corresponding to the log message.

If there is a corresponding log ID, the log classification unit 25 assigns the log ID to the target log message. On the other hand, if the corresponding log ID does not exist, the log classification unit 25 defines a new log ID and assigns the defined new log ID to the target log message. The log classification unit 25 records the new log ID and the log message corresponding to the new log ID to the classification storage unit 37.

For a plurality of logs received from the log reading unit 21, the same log messages may be classified into a single set by using an existing clustering method, and a log ID may be configured to be given to the classified set.

The log classification unit 25 transmits the classified result to the normal analysis unit 51. Since the operations subsequent to the normal analysis unit 51 are the same as the log analysis system 11 according to the first example embodiment, a detailed explanation thereabout is omitted.

[Advantages]

According to the log analysis system according to the present example embodiment, log analysis can also be performed on logs not having any log ID. The reason for this is that the log analysis system according to the present example embodiment has the log classification unit and the classification storage unit that give a log ID to a log message not having any log ID. As a result, according to the log analysis system according to the present example embodiment, abnormality of a log not having any log ID can be analyzed with a high degree of accuracy.

(Third Example Embodiment)

Subsequently, a log analysis system 13 according to the third example embodiment of the present invention will be explained with reference to drawings.

Figure 18:
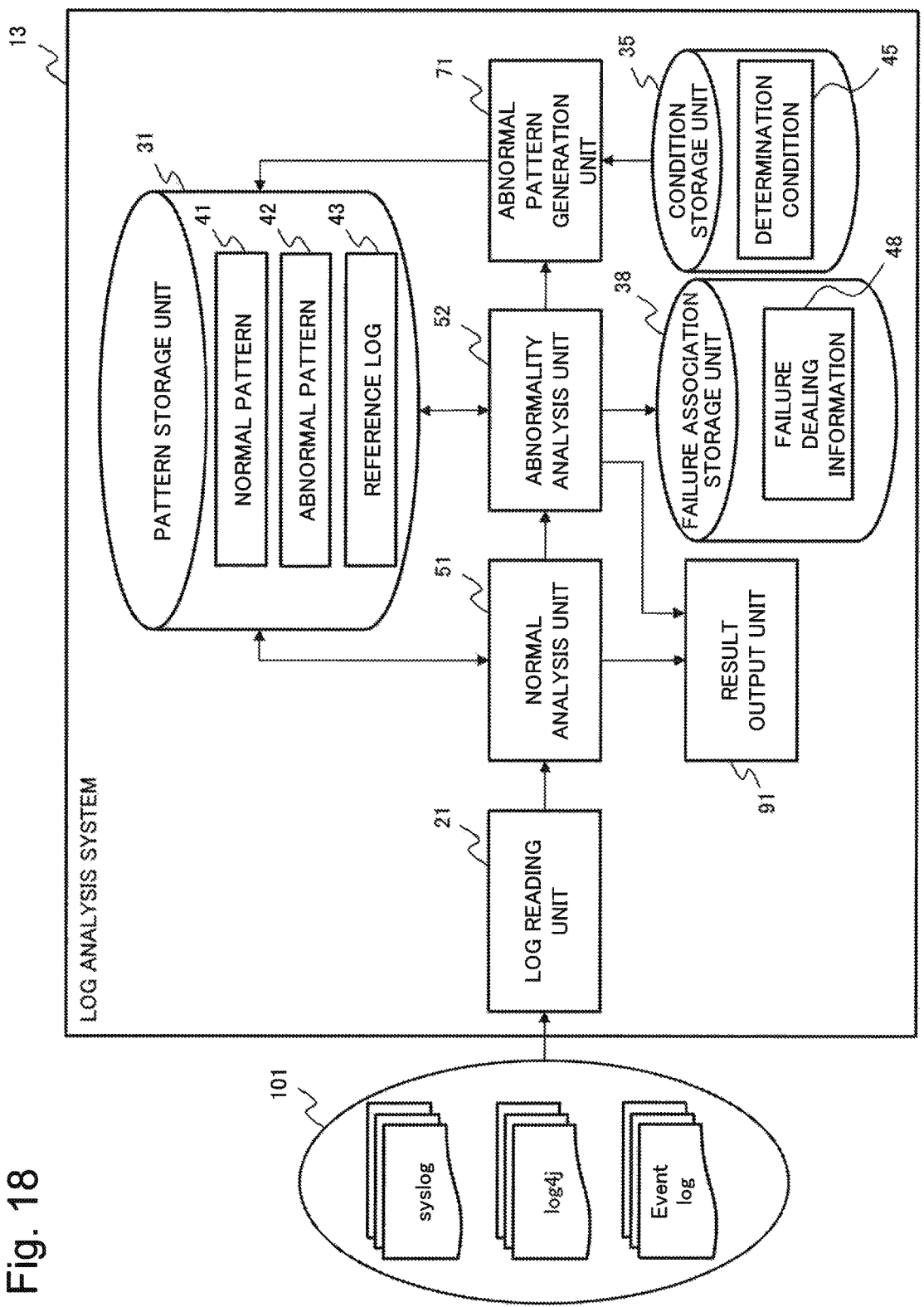
FIG. 18 is a block diagram illustrating a structure of a log analysis system according to a third example embodiment of the present invention.

FIG. 18 is a block diagram illustrating a structure of the log analysis system 13 according to the present example embodiment. The log analysis system 13 according to the present example embodiment has a structure in which a failure association storage unit 38 is added to the structure of the log analysis system 11 according to the first example embodiment. In FIG. 18, structures substantially the same as those in FIG. 1 are given the same reference numerals, and a detailed explanation thereabout is omitted.

The failure association storage unit 38 stores failure dealing information 48 (hereinafter referred to as failure dealing information). The failure dealing information is information defining an action content that the administrator actually performed at the time of an abnormal pattern occurrence in the past, or an action content to be executed by the administrator.

FIG. 19 illustrates an example of failure dealing information (failure dealing information table 148). The failure dealing information table 148 of FIG. 19 includes a date and time of occurrence of failure, an abnormal pattern ID corresponding to that failure, and an action content for that failure. The action content is an abnormality content and a content indicating a work executed during a failure in the past.

The abnormality analysis unit 52 compares the abnormality log input from the normal analysis unit 51 with the abnormal pattern recorded in the pattern storage unit 31. When there is a log matching the abnormal pattern, the abnormality analysis unit 52 transmits the abnormal pattern and failure dealing information corresponding to the abnormal pattern to the result output unit 91.

The result output unit 91 refers to the failure dealing information table stored in the failure association storage unit 38 with respect to the failure that have occurred, and outputs, to an output screen (not shown), information that allows the administrator to confirm the action content made when the same failure occurred in the past.

[Advantages]

According to the log analysis system of the third example embodiment, a support can be provided to administrator's analysis and work for dealing with the failure when an abnormality occurs. The reason for this is to present the work for dealing with the failure executed when the same abnormality occurred in the past or the work that should be executed by the administrator when the abnormality occurs.

(Fourth Example Embodiment)

Subsequently, a log analysis system 14 according to the fourth example embodiment of the present invention will be explained with reference to drawings.

Figure 20:
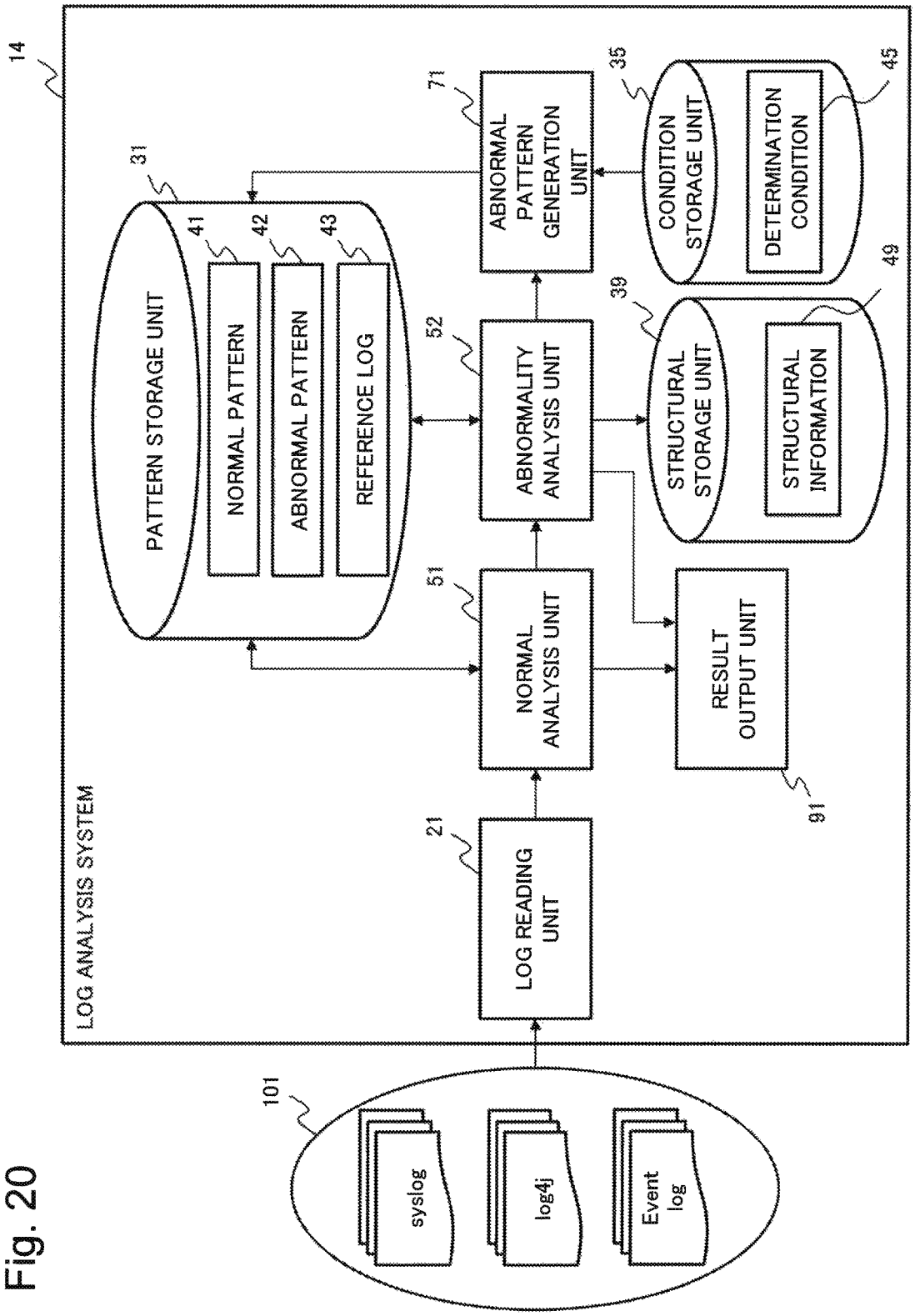
FIG. 20 is a block diagram illustrating a structure of a log analysis system according to a fourth example embodiment of the present invention.

FIG. 20 is a block diagram illustrating a structure of the log analysis system 14 according to the present example embodiment. The log analysis system 14 according to the present example embodiment has a structure in which a structural storage unit 39 is added to the structure of the log analysis system 11 according to the first example embodiment.

The structural storage unit 39 stores structural information 49 (hereinafter referred to as "structural information"). The structural information is information defining dependency relationship between the structural elements constituting the system of the analysis target and the relationship of the log files associating with the structural elements.

It is to be noted that the term "structural element" as used herein means apparatuses such as a server, a storage, a terminal apparatus, and a sensor that constitute the system of the analysis target, or software installed in those apparatuses. Each structural element is connected to the apparatus where the log analysis system operates via a network such as the Internet or an intranet.

The abnormality analysis unit 52 refers to the structural information and combines the logs included in the abnormal pattern for each structural element, and outputs it to the result output unit 91.

The result output unit 91 collects the logs included in the abnormal pattern received from the abnormality analysis unit 52 and outputs the logs for each structural element. The result output unit 91 may directly refer to the structural information and organize the logs included in the abnormal pattern received from the abnormality analysis unit 52 for each structural element.

For example, in the pattern "1→2→3→4", the log message "1" is assumed to be a message which belongs to the structural element "vm001", the log messages "2, 3" are assumed to be messages which belong to the structural element "vm002", and the log message "4" is assumed to be a message which belongs to the structural element "vm003". In this case, the result output unit 91 outputs the abnormal pattern in the following order "vm001→vm002→vm003".

Figure 21:
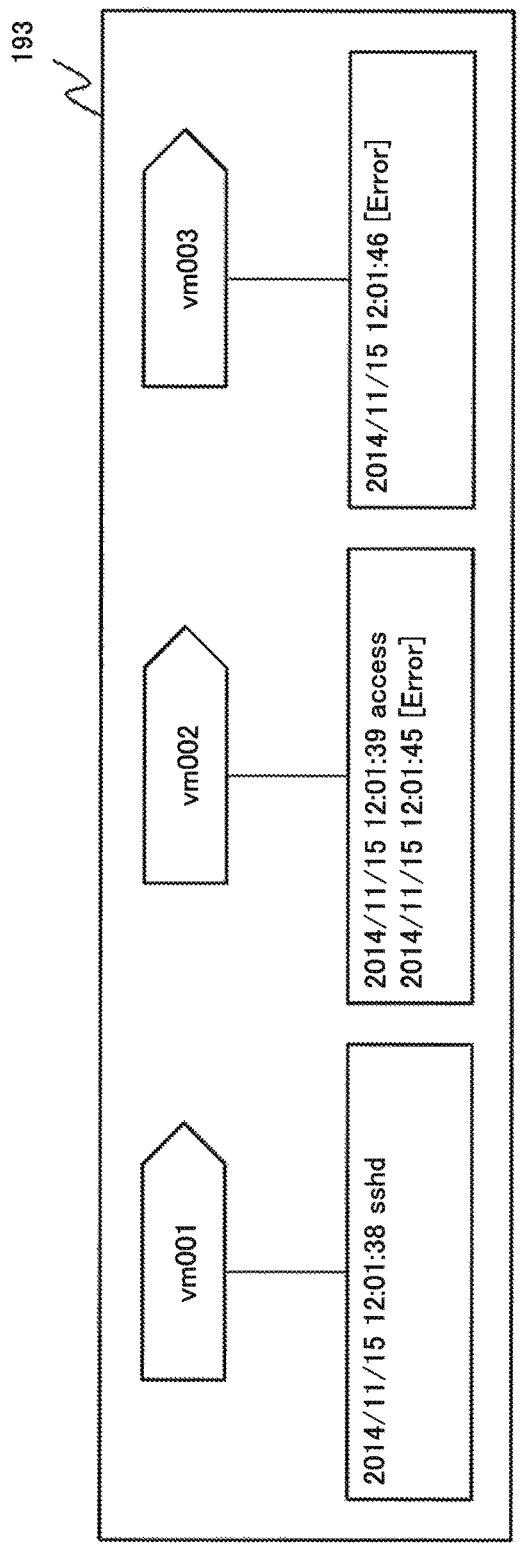
FIG. 21 is a figure illustrating an example of an analysis result of an abnormal pattern according to the fourth example embodiment of the present invention.

An example of output result (output result screen 193) is shown FIG. 21. The output result screen 193 of FIG. 21 is an example of outputting the structural elements and the logs on the same screen as an analysis result. In the output result screen 193, the host names of the structural elements are displayed from the left to the right according to the chronological order of the abnormal pattern, and indicates that the abnormal pattern is in the following order "vm001→vm002→vm003". In the output result screen 193, logs associating with each structural element are displayed at the bottom of the host name of each structural element. Logs corresponding to each structural element need only be clarified in such a manner that the logs are corresponding to each structural element, and the display is not limited to the arrangement as shown in FIG. 21. The output result screen 193 of FIG. 21 is an example, and an icon of the structural element is not limited to the host name, and any kind of information such as application name or system name can be used as long as it can specify a structural element.

Figure 22:
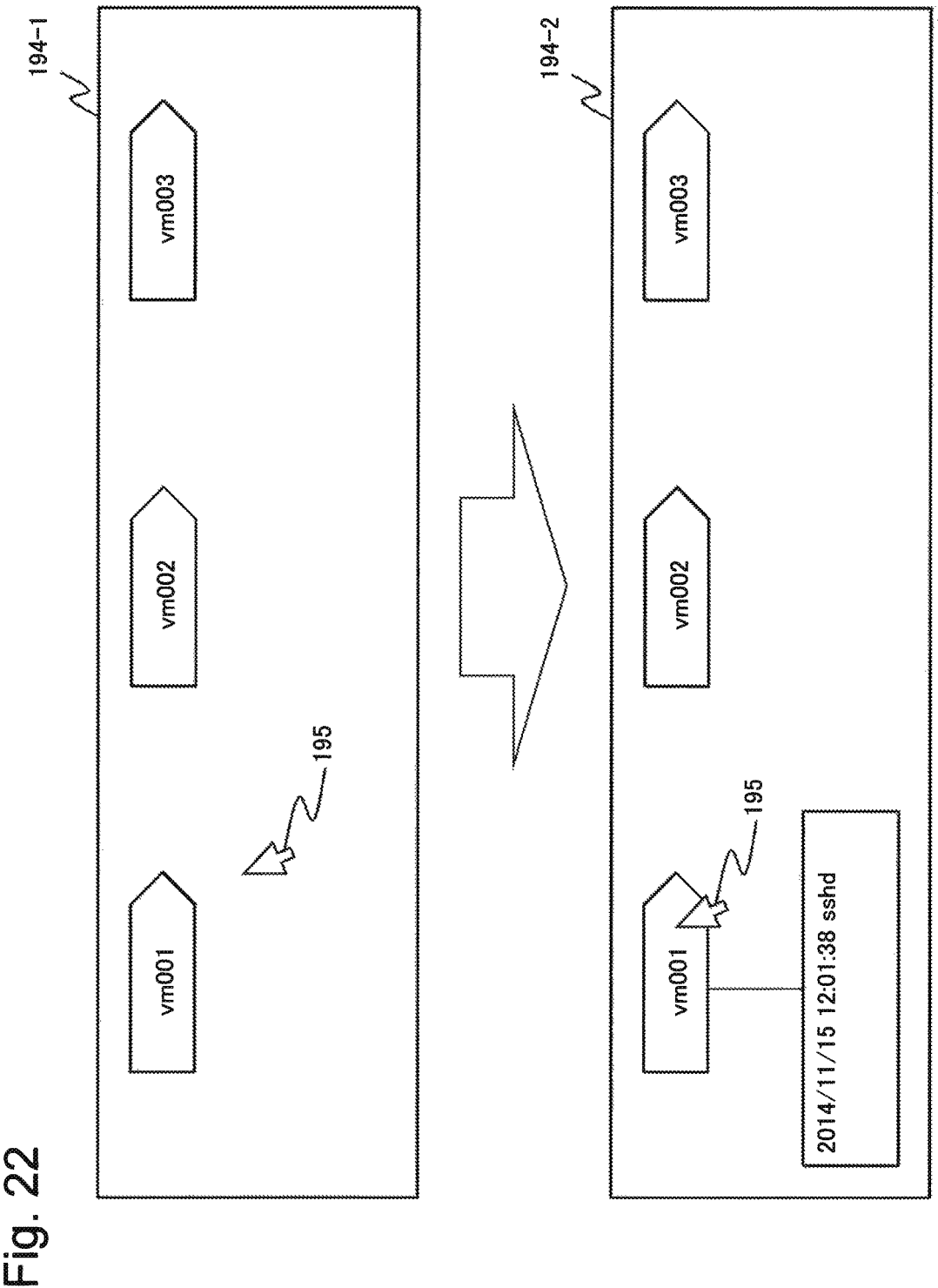
FIG. 22 is a figure illustrating an example of an analysis result of an abnormal pattern according to the fourth example embodiment of the present invention.

As shown in the output result screen 194 of FIG. 22, logs corresponding to each structural element may be displayed when clicking the icon indicating the structural element or moving the pointer to the icon indicating the structural element. In an output result screen 194-1 on the upper side of FIG. 22, a pointer 195 in a form of an arrow moving according to the operation of the administrator is not on the icon of the structural element, and accordingly, the log corresponding to each structural element is not displayed. On the other hand, in an output result screen 194-2 at the bottom of FIG. 22, the pointer 195 is on the structural element "vm001", and accordingly, the log of the structural element "vm001" is displayed below the icon.

Furthermore, the color of the icon indicating the structural element including the incomplete log in the abnormal pattern and the color of the icon indicating the structural element including the unknown log may be changed and displayed.

[Advantages]

According to the log analysis system of the fourth example embodiment, the administrator's analysis and work for dealing with the failure at abnormality occurrence can be supported. The reason for this is to present an abnormality log by making association with each structural element when an abnormality occurs.

(Fifth Example Embodiment)

Subsequently, a log analysis system 15 according to the fifth example embodiment of the present invention will be explained with reference to drawings.

Figure 23:
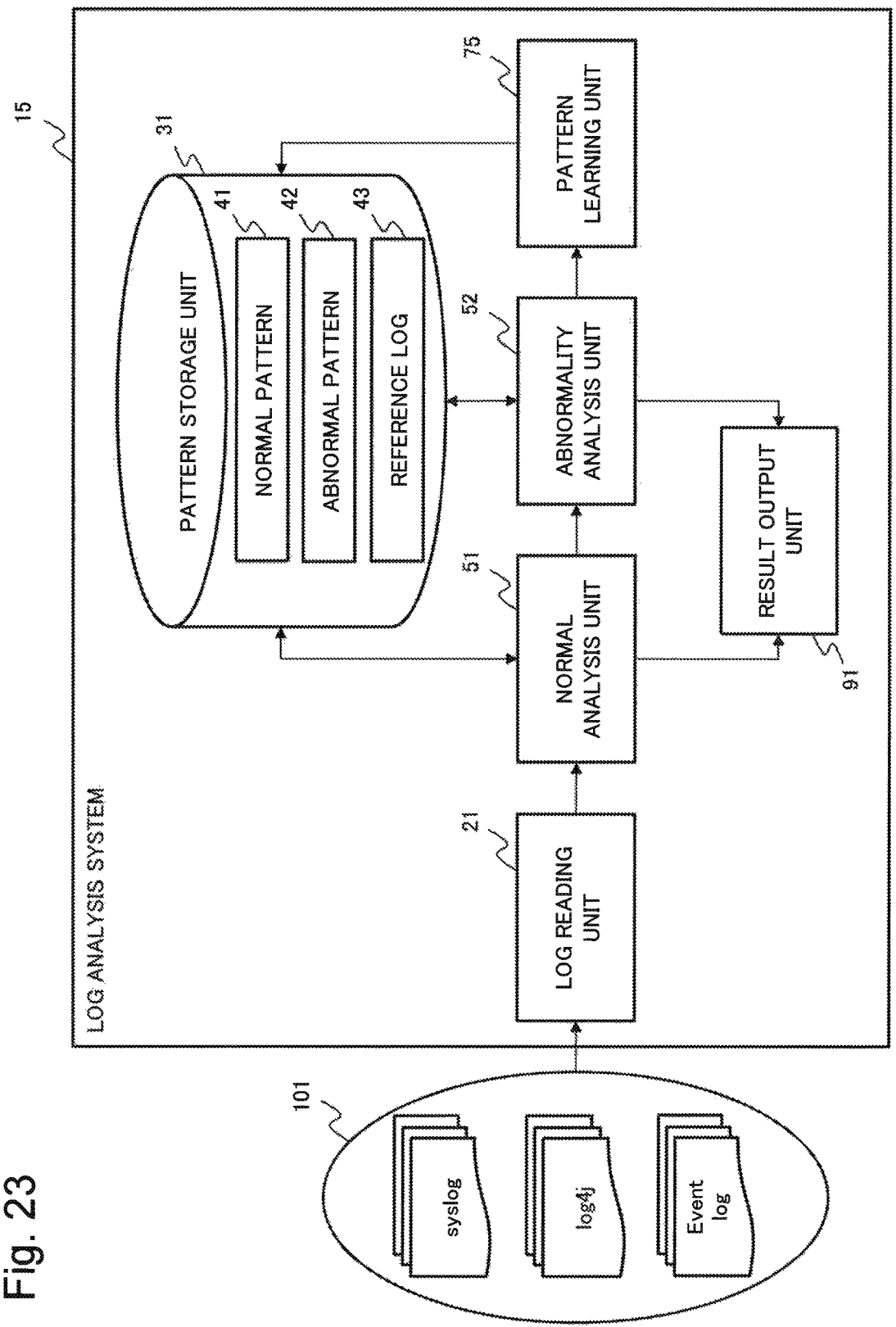
FIG. 23 is a block diagram illustrating a structure of a log analysis system according to a fifth example embodiment of the present invention.

FIG. 23 is a block diagram illustrating a structure of a log analysis system 15 according to the present example embodiment. The log analysis system 15 according to the present example embodiment include a pattern learning unit 75 instead of the abnormal pattern generation unit 71 and the determination condition 45 provided in the log analysis system 11 according to the first example embodiment.

Since the operation of the log reading unit 21 and the normal analysis unit 51 is the same as the operation of the elements in the log analysis system according to the first example embodiment, the explanation thereabout is omitted.

The abnormality analysis unit 52 compares the incomplete log and the unknown log received from the normal analysis unit 51 with the abnormal pattern recorded in the pattern storage unit 31, and determines whether a pattern matching the abnormal pattern is included in the received incomplete log and unknown log. If there is a pattern that matches the abnormal pattern, the abnormality analysis unit 52 transmits the matched result to the result output unit 91. If there is no pattern matching the abnormal pattern, the abnormality analysis unit 52 sends the incomplete log and the unknown log to the pattern learning unit 75.

The pattern learning unit 75 executes pattern generation processing based on the incomplete log and the unknown log received from the abnormality analysis unit 52 and records the generated pattern to the pattern storage unit 31.

Here, the operation of the pattern learning unit 75 will be described in detail with reference to the flowchart of FIG. 24.

Figure 24:
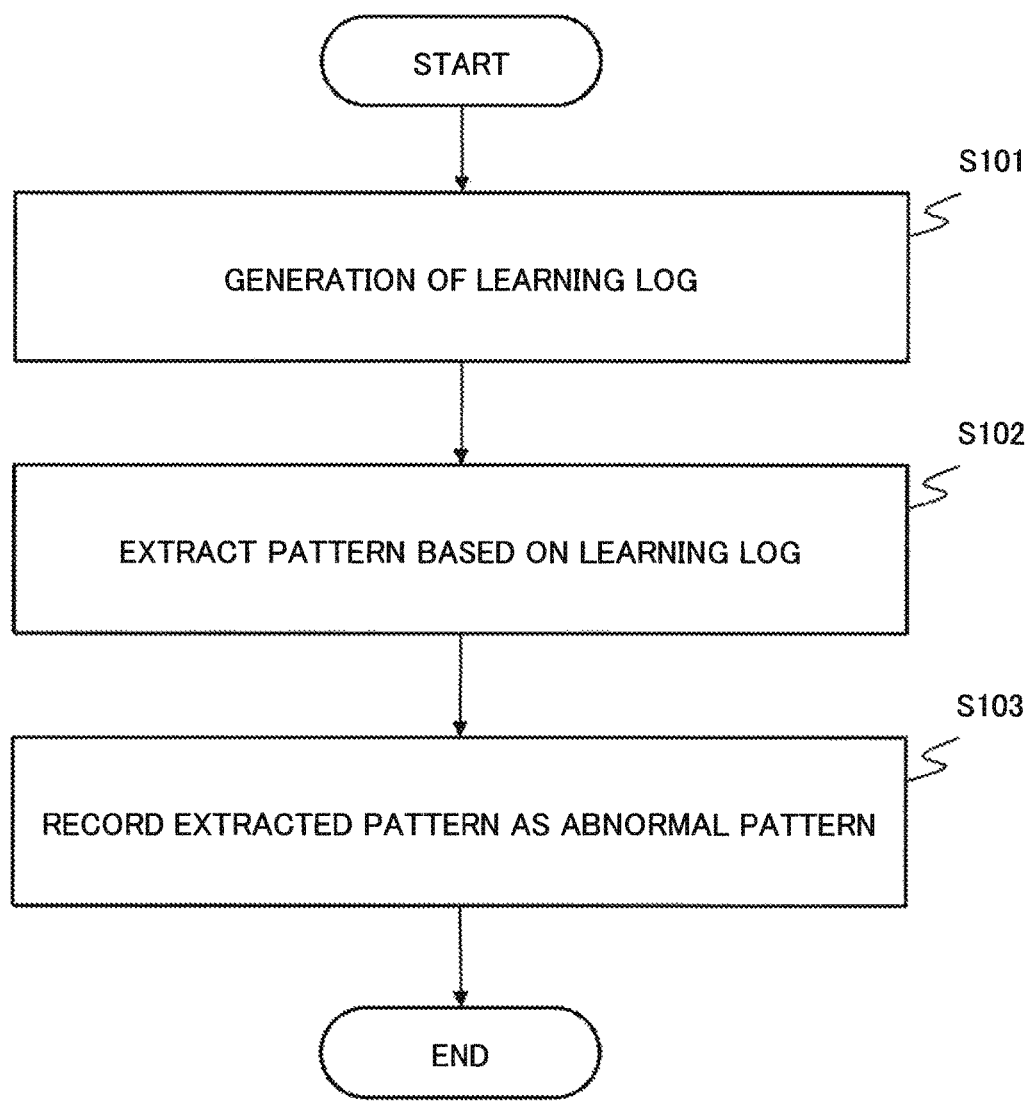
FIG. 24 is a flowchart about an operation of a pattern learning unit of the log analysis system according to the fifth example embodiment of the present invention.

In FIG. 24, first, the pattern learning unit 75 generates a log in which all the incomplete logs and the unknown logs received from the abnormality analysis unit 52 are sorted in the chronological order (FIG. 24: step S101). Hereinafter, the log in which the incomplete logs and the unknown logs are sorted in the chronological order will be referred to as a learning log.

Subsequently, based on the generated learning log, the pattern learning unit 75 uses transition probabilities and the like between logs to extract a combination of logs or chronological order (also referred to as a structural pattern) satisfying a certain condition as a pattern existing in the inside of the learning log (FIG. 24: step S102).

The pattern learning unit 75 may extract a pattern using a pattern recognition algorithm such as APRIORI, prefixspan, FP-Growth (Frequent Pattern Growth). The pattern learning unit 75 may extract a pattern using BIDE (BI-Directional Extension) as a pattern recognition algorithm. The pattern recognition algorithms given here are examples, and these algorithms may be combined or algorithms other than these algorithms may be used.

Subsequently, the pattern learning unit 75 records the extracted pattern as an abnormal pattern in the pattern storage unit 31 (FIG. 24: step S103).

The pattern generated by the pattern learning unit 75 may be output to an output unit (not shown), and the administrator may refer to the output result. In that case, the administrator may define whether the output pattern is a normal pattern or an abnormal pattern, and the defined result may be configured to be input with an input unit not shown. The pattern learning unit 75 may record the pattern as a normal pattern or an abnormal pattern to the pattern storage unit 31 based on the definition entered by the administrator.

The above is an explanation about the operation of the pattern learning unit 75. It should be noted that the pattern generation processing in FIG. 24 is processing corresponding to step S7 and step S8 in FIG. 6.

According to the log analysis system according to the present example embodiment, the same advantages as those of the log analysis system according to the first example embodiment can be obtained.

The structural elements of the log analysis system according to the first to the fifth example embodiments can be combined as necessary. The present invention is not limited to the above first to fifth example embodiments but can be implemented in various modes. It is to be noted that block divisions of the functional structure of the log analysis system according to the first to the fifth example embodiments shown in the drawings are structures given for convenience of description, and the implementation thereof is not limited to the structural shown in the block diagrams.

(Sixth Example Embodiment)

Subsequently, a log analysis system 10 according to the sixth example embodiment of the present invention will be explained. The log analysis system 10 according to the present example embodiment is a system which makes a superordinate concept of the log analysis system according to the first to the fifth example embodiments.

Figure 25:
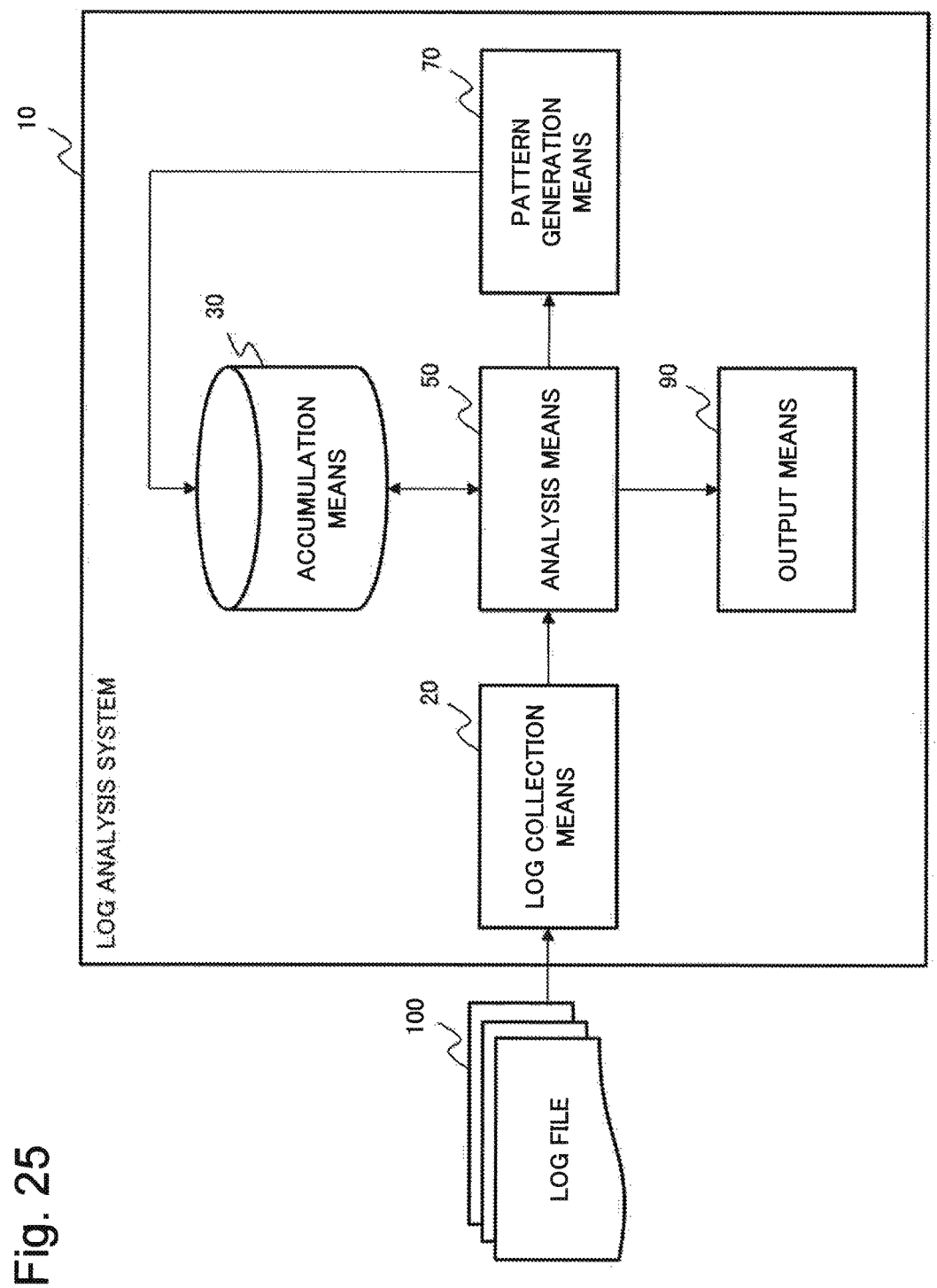
FIG. 25 is a block diagram illustrating a structure of a log analysis system according to a sixth example embodiment of the present invention.
Figure 26:
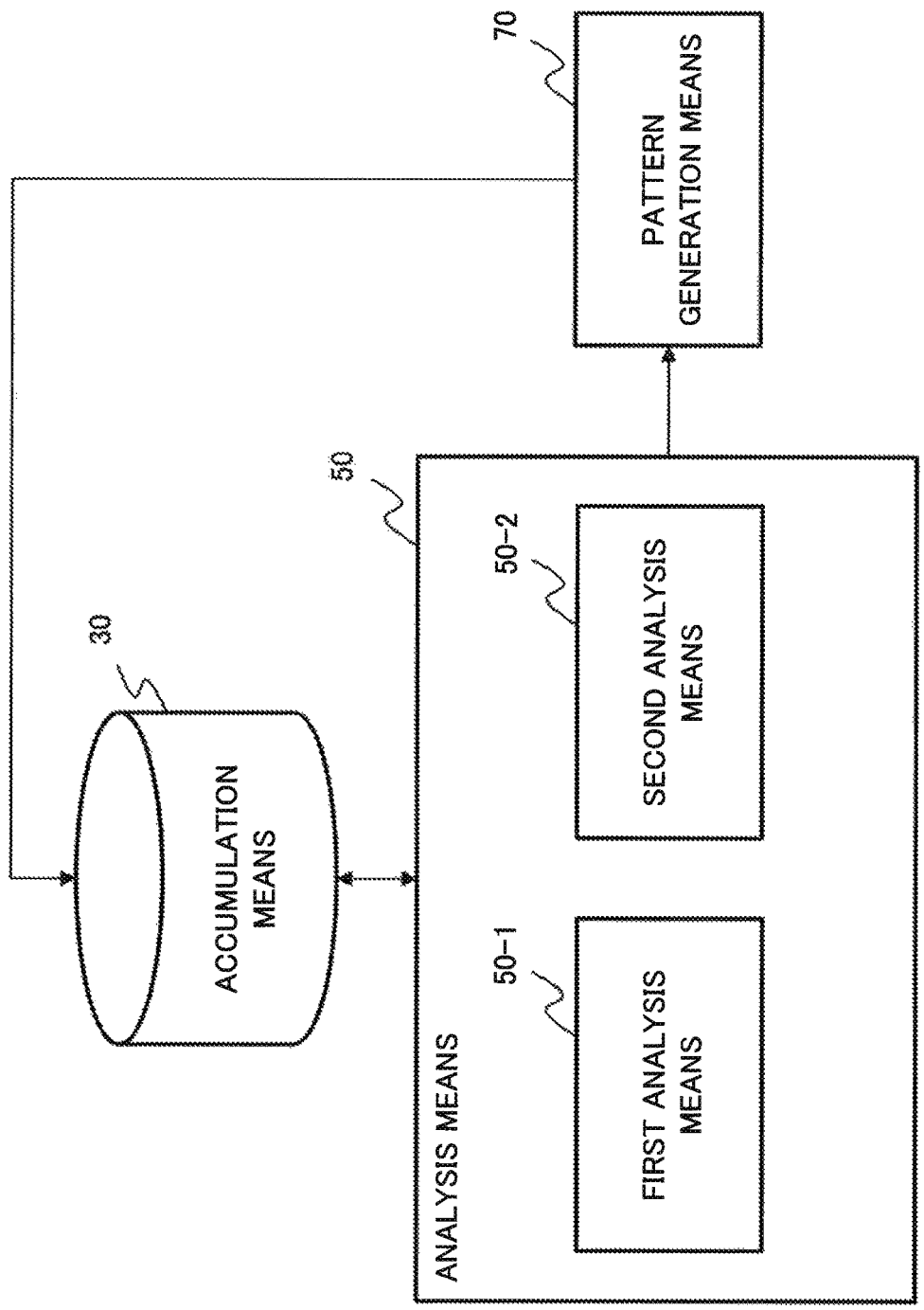
FIG. 26 is a block diagram illustrating an internal structural of analysis means of the log analysis system according to the sixth example embodiment of the present invention.

FIG. 25 and FIG. 26 are block diagrams illustrating structures of the log analysis system 10 according to the present example embodiment. As shown in FIG. 25, the log analysis system 10 according to the present example embodiment includes log collection means 20, accumulation means 30, analysis means 50, pattern generation means 70, and output means 90. Each means that constitutes the log analysis system 10 may be structured in a circuit or structured as software.

The log collection means 20 has the functions of the log reading unit 21 of the log analysis system according to the first to the fifth example embodiments. The log collection means 20 may have a log classification unit 25 of the log analysis system according to the second example embodiment.

The accumulation means 30 has the function of the pattern storage unit 31 of the log analysis system according to the first to the fifth example embodiments.

The accumulation means 30 accumulates a first pattern which is a structural pattern of a log message group included in a normal log file, a second pattern which is a different structural pattern from the first pattern, and first reference information corresponding to the second pattern. The first pattern corresponds to the normal pattern, the second pattern corresponds to the abnormal pattern, and the first reference information corresponds to the first reference log. Since the normal pattern and the abnormal pattern accumulated in the accumulation means 30 are known, the normal pattern and the abnormal pattern are sometimes collectively referred to as the known pattern.

Depending on the structure, the accumulation means 30 may have the functions of the condition storage unit 35, the classification storage unit 37, the failure association storage unit 38, and the structural storage unit 39.

As shown in FIG. 26, the analysis means 50 has a first analysis means 50-1 having the function of the normal analysis unit 51 of the log analysis system according to the first to the fifth example embodiments and a second analysis means 50-2 having the function of the abnormality analysis unit 52.

The analysis means 50 outputs an analysis result comparing the structural pattern of the log message group with the known pattern and outputs information about the known pattern which matches the structural pattern of another log message group supplementary to the log message group. Information about the known pattern that matches the structural pattern of another log message group supplementary to the log message group means the second reference information.

The first analysis means 50-1 acquires the log message group included in the log file of the analysis target and analyzes whether the obtained structural pattern of log message group matches the first pattern.

When the structural pattern of the log message group matches the first pattern, the first analysis means 50-1 outputs an analysis result indicating that the log message group is normal.

If the structural pattern of the log message group does not match the first pattern, the first analysis means 50-1 outputs to the output means 90 an analysis result indicating that the log message group is abnormal. The first analysis means 50-1 outputs the log message group analyzed as abnormal and the second reference information including the information about the first pattern matching another log message group supplementary to the log message group to the second analysis means 50-2.

It should be noted that the log message group output from the first analysis means 50-1 corresponds to the abnormality log in the first to the fifth example embodiments. The second reference information output from the first analysis means 50-1 corresponds to the second reference log in the first to the fifth example embodiments.

The second analysis means 50-2 acquires the log message group and the second reference information from the first analysis means 50-1 and analyzes whether or not the obtained structural pattern of the log message group matches the second pattern.

When the structural pattern of the log message group matches the second pattern, the second analysis means 50-2 outputs a second pattern which matches the structural pattern of the log message group. In addition, the second analysis means 50-2 outputs the information about the first pattern which is common between the second reference information and the first reference information corresponding to the second pattern.

If the structural pattern of the log message group does not match the second pattern, the second analysis means 50-2 outputs the log message group and the second reference information to the pattern generation means.

The pattern generation means 70 has the function of the abnormal pattern generation unit 71 of the log analysis system according to the first to the fifth example embodiments.

Based on the analysis result by the analysis means 50, the pattern generation means 70 combines a plurality of log messages included in a log message group having a different structural pattern from the known pattern to generate a new pattern. The pattern generation means 70 associates information (second reference information) about a known pattern that matches the structural pattern of another log message group occurring supplementary to the log message group with a new pattern.

The pattern generation means 70 receives the log message group and the second reference information from the second analysis means 50-2. The pattern generation means 70 combines the log message included in the first pattern with the log message which is of the log messages not included in the first pattern and which satisfies the predetermined determination condition from the log message constituting the log message group to generate a new structural pattern.

The pattern generation means 70 adds the generated new structural pattern as a second pattern to the accumulation means 30 and adds, to the accumulation means 30, the second reference information corresponding to a new structural pattern as the first reference information corresponding to the added second pattern.

The pattern generation means 70 may have the function of a pattern learning unit 75 of the log analysis system according to the fifth example embodiment.

The output means 90 has the function of the result output unit 91 of the log analysis system according to the first to the fifth example embodiments. For example, the output means 90 displays the analysis results of the first analysis means 50-1 and the second analysis means 50-2 on a monitor or the like.

The above is an explanation about the structure of the log analysis system 10 according to the present example embodiment. The operation and the functions of the structural elements of the log analysis system 10 are as explained with the log analysis system according to the first to the fifth example embodiments.

(Seventh Example Embodiment)

Subsequently, the log analysis system according to the seventh example embodiment of the present invention will be explained. The log analysis system according to the present example embodiment is a system which makes a superordinate concept of the log analysis system according to the sixth example embodiment.

Figure 27:
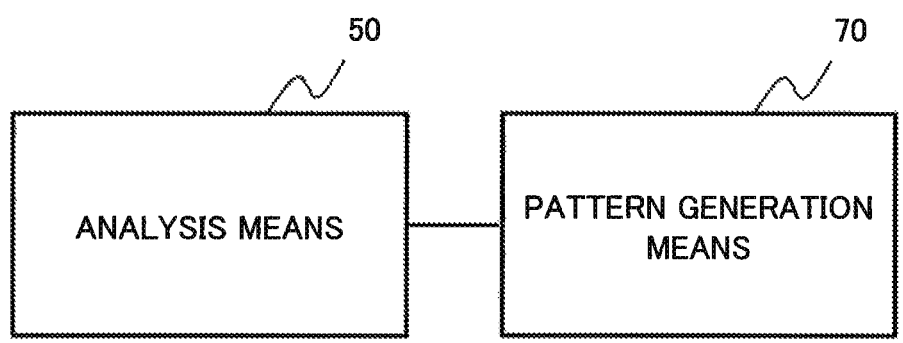
FIG. 27 is a block diagram illustrating an internal structure of the analysis means of the log analysis system according to the sixth example embodiment of the present invention.

FIG. 27 is a block diagram illustrating a structure of a log analysis system according to the present example embodiment. As shown in FIG. 27, the log analysis system according to the present example embodiment includes analysis means 50 and pattern generation means 70. Each means that constitutes the log analysis system may be structured in a circuit or structured as software.

The analysis means 50 compares the structural pattern of the log message group constituted by at least one log message with the known pattern and analyzes the structural pattern. Then, the analysis means 50 associates the reference information including information about a known pattern that matches the structural pattern of another log message group supplementary to the log message group with the structural pattern of the log message group.

According to the analysis result by the analysis means 50, the pattern generation means 70 generates a new pattern from a log message group having a different structural pattern from the known pattern.

According to the log analysis means according to the present example embodiment, the failure occurring in the information processing system can be specified and analyzed with a high degree of accuracy.

(Hardware)

Hereinafter, the hardware that realizes the log analysis system according to each example embodiment of the present invention will be explained.

Figure 28:
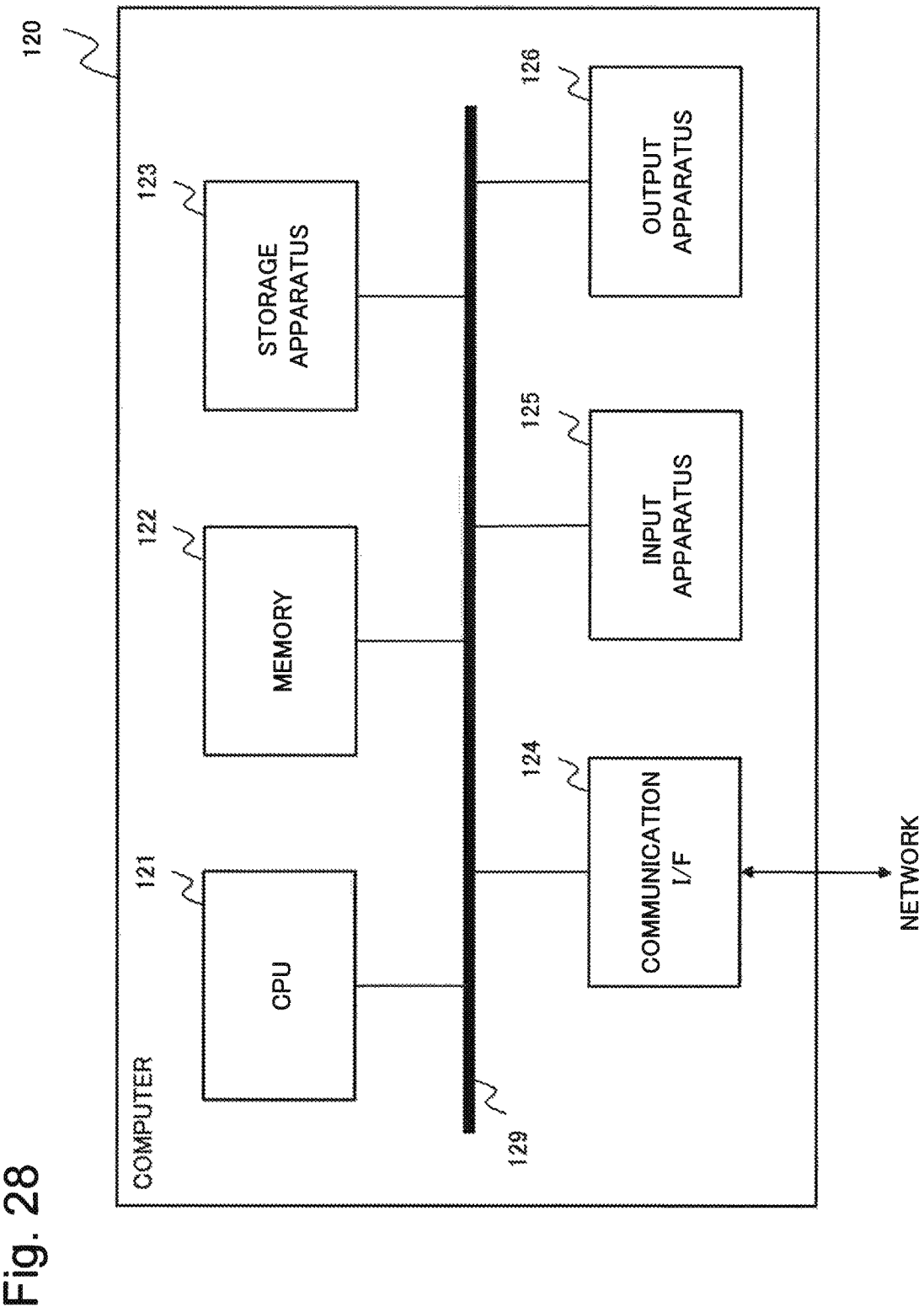
FIG. 28 is a block diagram illustrating an example of a hardware structure for realizing the log analysis system according to each example embodiment of the present invention.

For example, the log analysis system according to each example embodiment can be realized by the computer 120 of a structure as shown in FIG. 28. The computer 120 includes a CPU 121 (Central Processing Unit), a memory 122, a storage apparatus 123, and a communication interface 124. The computer 120 may also include an input apparatus 125 or an output apparatus 126. Each structure of the computer 120 is connected to each other by a bus 129.

For example, the functions of the log analysis system is realized by causing the CPU 121 to execute a computer program (a software program, hereinafter simply referred to as "a program") read to the memory 122. Upon execution of the program, the CPU 121 appropriately controls the communication interface 124, the input apparatus 125, and the output apparatus 126.

The present invention, which is described by using each example embodiment as an example, is also constituted by a nonvolatile storage medium such as a compact disc in which such program is stored. For example, the program stored in the storage medium is read by a drive apparatus.

For example, the communication executed by the log analysis system according to each example embodiment is realized by the application program controlling the communication interface using the functions provided by the OS (Operating System). For example, the input apparatus 125 is a keyboard, a mouse, or a touch panel. For example, the output apparatus 126 is a display.

The log analysis system according to each example embodiment and the hardware structure of each functional block are not limited to the above-mentioned structure. The log analysis system according to each example embodiment may be a structure in which two or more physically separated apparatuses are communicably connected by a wire or wirelessly. A log analysis program that causes the computer to process the log analysis system according to each example embodiment is also included in the scope of the present invention. In addition, the program recording medium which stores the log analysis program according to the example embodiment of the present invention is also included in the scope of the present invention.

Although the present invention has been described with reference to the example embodiments, the present invention is not limited to the above example embodiments. The structure and the details of the present invention, various changes that can be understood by those skilled in the art within the scope of the present invention can be made.

This application claims the priority based on Japanese Patent Application No. 2015-028455 filed on Feb. 17, 2015, the entire disclosure of which is incorporated herein by reference.

REFERENCE SIGNS LIST 10, 11, 12, 13, 14, 15 log analysis system
20 log collection means
21 log reading unit
25 log classification unit
30 accumulation means
31 pattern storage unit
35 condition storage unit
37 classification storage unit
38 failure association storage unit
39 structural storage unit
50 analysis means
51 normal analysis unit
52 abnormality analysis unit
70 pattern generation means
71 abnormal pattern generation unit
75 pattern learning unit
90 output means
91 result output unit

The invention claimed is:

1. A log analysis system comprising:
analysis circuitry that performs analysis by comparing a structural pattern of a log message group constituted by at least one log message with a known pattern, and associates, with the structural pattern of the log message group, reference information comprising information about the known pattern matching a structural pattern of another log message group supplementary the log message group; and
pattern generation circuitry that generates a new pattern from the log message group having a structural pattern different from the known pattern in accordance with an analysis result given by the analysis circuitry,
wherein the analysis circuitry includes
first analysis circuitry that analyzes whether the structural pattern of the log message group matches a first pattern, wherein when the structural pattern of the log message group matches the first pattern, the first analysis circuitry outputs an analysis result indicating that the log message group is normal, and when the structural pattern of the log message group does not match the first pattern, the first analysis circuitry outputs an analysis result indicating that the log message group is abnormal, and the first analysis circuitry associates second reference information comprising information about the first pattern that matches another log message group supplementary to the log message group with the structural pattern of the log message group, and outputs the second reference information to a subsequent stage, and
second analysis circuitry that analyzes whether the structural pattern of the log message group obtained from the first analysis circuitry matches the second pattern, wherein when the structural pattern of the log message group matches the second pattern, the second analysis circuitry outputs the second pattern matching the structural pattern of the log message group and information about the first pattern that is common between the second reference information and the first reference information corresponding to the second pattern, and when the structural pattern of the log message group does not match the second pattern, the second analysis circuitry outputs the log message group and the second reference information.

2. The log analysis system according to claim 1,
wherein the pattern generation circuitry receives the log message group and the second reference information from the second analysis circuitry, generates a new structural pattern by combining a log message which is of the log messages constituting the log message group and which is comprised in the first pattern and a log message which is of the log messages not comprised in the first pattern and which satisfies a predetermined determination condition, adds the newly generated structural pattern as the second pattern, and adds the second reference information corresponding to the new structural pattern as first reference information corresponding to the added second pattern.

3. The log analysis system according to claim 2, wherein the first analysis circuitry analyzes whether the structural pattern of the log message group within a first time starting from an occurrence time of any one of the log messages comprised in the log message group matches the first pattern, wherein when an abnormality log comprising the log message group of which structural pattern does not match the first pattern is detected, the first analysis circuitry associates, with the abnormality log, the second reference information that occurred within a second time comprising the occurrence time of the abnormality log, and outputs the second reference information to the second analysis circuitry, the second analysis circuitry receives the abnormality log and the second reference information from the first analysis circuitry, and compares the received abnormality log and the second pattern, and when the abnormality log matching the second pattern is detected, the second analysis circuitry compares the second reference information corresponding to the abnormality log and the first reference information corresponding to the second pattern matching the abnormality log, and associates information about the common first pattern with the second pattern matching the abnormality log, wherein when the abnormality log is determined not to match the second pattern, the second analysis circuitry outputs the abnormality log and the second reference information corresponding to the abnormality log to the pattern generation circuitry, the pattern generation circuitry comprises an abnormal pattern generation circuit generating a new structural pattern by combining, in the abnormality log output from the second analysis circuitry, the log message group comprised in the first pattern and the log message group which is of the log message groups not comprised in the first pattern and which satisfies the predetermined determination condition, adding the generated new structural pattern as the second pattern, and adding the second reference information corresponding to the new structural pattern.

4. The log analysis system according to claim 3, wherein the abnormal pattern generation circuit adopts, as the determination condition, a third time starting from an occurrence time of any one of the log messages comprised in the first pattern, and with regard to the abnormality log output from the second analysis circuitry, combines the log message group not comprised in the first pattern occurred within the third time and the log message group comprised in the first pattern.

5. The log analysis system according to claim 2, further comprising:
a log classification circuit configured to give an identifier capable of uniquely identify each of a plurality of the log messages; and
a classification storage circuit storing an association relationship between the log message and the identifier.

6. The log analysis system according to claim 3, further comprising:
a failure association storage circuit storing an action content corresponding to the second pattern,
wherein when the log message group having a structural pattern matching the second pattern is detected in the abnormality log, the second analysis circuitry refers to the failure association storage circuit, and associates, with the second pattern, the action content corresponding to the second pattern matching the structural pattern of the log message group detected.

7. The log analysis system according to claim 3, comprising:
a structural information storage circuit storing a structural element outputting the log message group,
wherein when the log message group having a structural pattern matching the second pattern is detected in the abnormality log, the second analysis circuitry refers to the structural information storage circuit and associates, with the structural element, the log message comprised in the structural pattern of the log message group detected.

8. The log analysis system according to claim 2, wherein the first analysis circuitry analyzes whether the structural pattern of the log message group matches the first pattern within a first time starting from an occurrence time of any one of the log messages comprised in the log message group, wherein when an abnormality log comprising the log message group having a structural pattern not matching the first pattern is detected, the first analysis circuitry associates, with the abnormality log, the abnormality log and the second reference information occurred within a second time comprising an occurrence time of the abnormality log, and outputs the abnormality log and the second reference information to the second analysis circuitry, wherein the second analysis circuitry receives the abnormality log output from the first analysis circuitry and the second reference information corresponding to the abnormality log, and compares the received abnormality log and the second pattern, wherein when the abnormality log is determined to match the second pattern, the second analysis circuitry compares the second reference information corresponding to the abnormality log and the first reference information corresponding to the second pattern matching the abnormality log, associates information about the common first pattern with the second pattern matching the abnormality log, wherein when where the abnormality log is determined not to match the second pattern, the second analysis circuitry outputs the abnormality log and the second reference information corresponding to the abnormality log to the pattern generation circuitry, wherein the pattern generation circuitry comprises a pattern learning circuit generating a learning log in which log files comprised in the abnormality log received from the second analysis circuitry are sorted in a chronological order, and extracting, as a new structural pattern, the structural pattern of the log message group satisfying a certain condition using a pattern recognition algorithm based on the generated learning log.

9. A log analysis method comprising:
performing analysis by comparing a known pattern and a structural pattern of a log message group structured by at least one log message;
associating, with the structural pattern of the log message group, reference information comprising information about the known pattern matching a structural pattern of another log message group supplementary to the log message group; and
generating a new pattern from the log message group having a structural pattern different from the known pattern according to an analysis result,
wherein the performing comprises
analyzing whether the structural pattern of the log message group matches a first pattern, wherein when the structural pattern of the log message group matches the first pattern, outputting an analysis result indicating that the log message group is normal, and when the structural pattern of the log message group does not match the first pattern, outputting an analysis result indicating that the log message group is abnormal, associating second reference information comprising information about the first pattern that matches another log message group supplementary to the log message group with the structural pattern of the log message group, and outputting the second reference information to a subsequent stage, and
analyzing whether the structural pattern of the log message group obtained from the first analysis circuitry matches the second pattern, wherein when the structural pattern of the log message group matches the second pattern, outputting the second pattern matching the structural pattern of the log message group and information about the first pattern that is common between the second reference information and the first reference information corresponding to the second pattern, and when the structural pattern of the log message group does not match the second pattern, outputting the log message group and the second reference information.

10. A non-transitory program recording medium recorded with a log analysis program causing a computer to execute:
processing for performing analysis by comparing a known pattern and a structural pattern of a log message group structured by at least one log message;
processing for associating, with the structural pattern of the log message group, reference information comprising information about the known pattern matching a structural pattern of another log message group supplementary to the log message group; and
processing for generating a new pattern from the log message group having a structural pattern different from the known pattern according to an analysis result,
wherein the processing for performing analysis comprises
processing for analyzing whether the structural pattern of the log message group matches a first pattern, wherein when the structural pattern of the log message group matches the first pattern, outputting an analysis result indicating that the log message group is normal, and when the structural pattern of the log message group does not match the first pattern, outputting an analysis result indicating that the log message group is abnormal, and associating second reference information comprising information about the first pattern that matches another log message group supplementary to the log message group with the structural pattern of the log message group, and outputting the second reference information to a subsequent stage, and
processing for analyzing whether the structural pattern of the log message group obtained from the first analysis circuitry matches the second pattern, wherein when the structural pattern of the log message group matches the second pattern, outputting the second pattern matching the structural pattern of the log message group and information about the first pattern that is common between the second reference information and the first reference information corresponding to the second pattern, and when the structural pattern of the log message group does not match the second pattern, outputting the log message group and the second reference information outputting the log message group and the second reference information.

11. The log analysis system according to claim 3, further comprising:
a log classification circuit for giving an identifier configured to uniquely identify each of a plurality of the log messages; and
a classification storage circuit storing an association relationship between the log message and the identifier.

12. The log analysis system according to claim 4, further comprising:
a log classification circuit for giving an identifier configured to uniquely identify each of a plurality of the log messages; and
a classification storage circuit storing an association relationship between the log message and the identifier.

13. The log analysis system according to claim 4, further comprising:
a failure association storage circuit storing an action content corresponding to the second pattern,
wherein when the log message group having a structural pattern matching the second pattern is detected in the abnormality log, the second analysis circuitry refers to the failure association storage circuit, and associates, with the second pattern, the action content corresponding to the second pattern matching the structural pattern of the log message group detected.

14. The log analysis system according to claim 5, further comprising:
a failure association storage circuit storing an action content corresponding to the second pattern,
wherein when the log message group having a structural pattern matching the second pattern is detected in the abnormality log, the second analysis circuitry refers to the failure association storage circuit, and associates, with the second pattern, the action content corresponding to the second pattern matching the structural pattern of the log message group detected.

15. The log analysis system according to claim 4, further comprising:
a structural information storage circuit storing a structural element outputting the log message group,
wherein when the log message group having a structural pattern matching the second pattern is detected in the abnormality log, the second analysis circuitry refers to the structural information storage circuit and associates, with the structural element, the log message comprised in the structural pattern of the log message group detected.

16. The log analysis system according to claim 5, further comprising:
a structural information storage circuit storing a structural element outputting the log message group,
wherein when the log message group having a structural pattern matching the second pattern is detected in the abnormality log, the second analysis circuitry refers to the structural information storage circuit and associates, with the structural element, the log message comprised in the structural pattern of the log message group detected.

17. The log analysis system according to claim 6, further comprising:
a structural information storage circuit storing a structural element outputting the log message group,
wherein when the log message group having a structural pattern matching the second pattern is detected in the abnormality log, the second analysis circuitry refers to the structural information storage circuit and associates, with the structural element, the log message comprised in the structural pattern of the log message group detected.

18. The log analysis system according to claim 3, wherein the first analysis circuitry analyzes whether the structural pattern of the log message group matches the first pattern within the first time starting from the occurrence time of any one of the log messages comprised in the log message group, wherein when the abnormality log comprising the log message group having the structural pattern not matching the first pattern is detected, the first analysis circuitry associates, with the abnormality log, the abnormality log and the second reference information that occurred within the second time comprising the occurrence time of the abnormality log, and outputs the abnormality log and the second reference information to the second analysis circuitry,
wherein the second analysis circuitry receives the abnormality log output from the first analysis circuitry and the second reference information corresponding to the abnormality log, and compares the received abnormality log and the second pattern, wherein when the abnormality log is determined to match the second pattern, the second analysis circuitry compares the second reference information corresponding to the abnormality log and the first reference information corresponding to the second pattern matching the abnormality log, associates information about the common first pattern with the second pattern matching the abnormality log, wherein when the abnormality log is determined not to match the second pattern, the second analysis circuitry outputs the abnormality log and the second reference information corresponding to the abnormality log to the pattern generation circuitry, and
wherein the pattern generation circuitry comprises a pattern learning circuit generating a learning log in which log files comprised in the abnormality log received from the second analysis circuitry are sorted in a chronological order, and extracting, as a new structural pattern, the structural pattern of the log message group satisfying a certain condition using a pattern recognition algorithm based on the generated learning log.

19. The log analysis system according to claim 4, wherein the first analysis circuitry analyzes whether the structural pattern of the log message group matches the first pattern within the first time starting from the occurrence time of any one of the log messages comprised in the log message group, wherein when an abnormality log comprising the log message group having the structural pattern not matching the first pattern is detected, the first analysis circuitry associates, with the abnormality log, the abnormality log and the second reference information that occurred within the second time comprising the occurrence time of the abnormality log, and outputs the abnormality log and the second reference information to the second analysis circuitry,
wherein the second analysis circuitry receives the abnormality log output from the first analysis circuitry and the second reference information corresponding to the abnormality log, and compares the received abnormality log and the second pattern, wherein when the abnormality log is determined to match the second pattern, the second analysis circuitry compares the second reference information corresponding to the abnormality log and the first reference information corresponding to the second pattern matching the abnormality log, associates information about the common first pattern with the second pattern matching the abnormality log, wherein when the abnormality log is determined not to match the second pattern, the second analysis circuitry outputs the abnormality log and the second reference information corresponding to the abnormality log to the pattern generation circuitry, and
wherein the pattern generation circuitry comprises a pattern learning circuit generating a learning log in which log files comprised in the abnormality log received from the second analysis circuitry are sorted in a chronological order, and extracting, as a new structural pattern, the structural pattern of the log message group satisfying a certain condition using a pattern recognition algorithm based on the generated learning log.

20. The log analysis system according to claim 5, wherein the first analysis circuitry analyzes whether the structural pattern of the log message group matches the first pattern within the first time starting from the occurrence time of any one of the log messages comprised in the log message group, wherein when the abnormality log comprising the log message group having the structural pattern not matching the first pattern is detected, the first analysis circuitry associates, with the abnormality log, the abnormality log and the second reference information that occurred within the second time comprising an occurrence time of the abnormality log, and outputs the abnormality log and the second reference information to the second analysis circuitry,
wherein the second analysis circuitry receives the abnormality log output from the first analysis circuitry and the second reference information corresponding to the abnormality log, and compares the received abnormality log and the second pattern, wherein when the abnormality log is determined to match the second pattern, the second analysis circuitry compares the second reference information corresponding to the abnormality log and the first reference information corresponding to the second pattern matching the abnormality log, associates information about the common first pattern with the second pattern matching the abnormality log, wherein when the abnormality log is determined not to match the second pattern, the second analysis circuitry outputs the abnormality log and the second reference information corresponding to the abnormality log to the pattern generation circuitry, and
wherein the pattern generation circuitry comprises a pattern learning circuit generating a learning log in which log files comprised in the abnormality log received from the second analysis circuitry are sorted in a chronological order, and extracting, as a new structural pattern, the structural pattern of the log message group satisfying a certain condition using a pattern recognition algorithm based on the generated learning log.

* * * * *